US012641372B2

(12) United States Patent
Van Den Keybus et al.

(10) Patent No.: US 12,641,372 B2
(45) Date of Patent: May 26, 2026

(54) LOUDSPEAKER AND METHOD OF MANUFACTURE

(71) Applicant: PSS BELGIUM NV, Dendermonde (BE)

(72) Inventors: Thomas Van Den Keybus, Dendermonde (BE); Kurt Vandijck, Dendermonde (BE); Johan Schepens, Dendermonde (BE); Jens Maschkiwitz, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 143 days.

(21) Appl. No.: 18/836,395

(22) PCT Filed: Feb. 7, 2023

(86) PCT No.: PCT/EP2023/052948
§ 371 (c)(1),
(2) Date: Aug. 7, 2024

(87) PCT Pub. No.: WO2023/152114
PCT Pub. Date: Aug. 17, 2023

(65) Prior Publication Data
US 2025/0119690 A1     Apr. 10, 2025

(30) Foreign Application Priority Data
Feb. 11, 2022    (GB) ...................................... 2201815

(51) Int. Cl.
H04R 9/02          (2006.01)
B29C 33/20        (2006.01)
(Continued)

(52) U.S. Cl.
CPC ............. H04R 9/025 (2013.01); B29C 33/20 (2013.01); B29C 45/14065 (2013.01);
(Continued)

(58) Field of Classification Search
CPC ........ H04R 9/025; H04R 9/06; H04R 31/006; B29C 33/20; B29C 45/14065
See application file for complete search history.

(56) References Cited

U.S. PATENT DOCUMENTS 3,342,953 A     9/1967   Ernst
5,147,657 A *   9/1992   Giza ................... B29C 45/2806
                                                              425/117

(Continued)

FOREIGN PATENT DOCUMENTS

CH          418401  A     8/1966
CN        1262592  A     8/2000
(Continued)

OTHER PUBLICATIONS

ISA/EPO, International Search report and Written Opinion for corresponding PCT Patent Application No. PCT/EP2023/052948, mailed Sep. 5, 2023, 12 pages.

*Primary Examiner* — Olisa Anwah
(74) *Attorney, Agent, or Firm* — NK Patent Law

(57)          ABSTRACT
There is provided a loudspeaker wherein a frame is moulded with a magnet system such that the frame extends through an aperture in the magnet system. By moulding the frame to extend as a single piece through an aperture, the frame can be attached to the magnet system without glue. The aperture in the magnet system extends from one side to another. By forming the frame to extend over the opening at each side, the frame can be securely connected to the magnet system. The aperture in the magnet system extends between a first surface and a second surface. The first surface and the second surface are on opposed sides of the magnet system. By the frame extending over at least a portion of the first and second surfaces, the frame extends over the apertures and securely connects the frame and magnet system, forming a unitary part.

17 Claims, 17 Drawing Sheets

(51) Int. Cl.
 *B29C 45/14*   (2006.01)
 *H04R 9/06*   (2006.01)
 *H04R 31/00*   (2006.01)
 *B29L 31/34*   (2006.01)

(52) U.S. Cl.
 CPC ............. *H04R 9/06* (2013.01); *H04R 31/006*
  (2013.01); *B29C 2045/14147* (2013.01); *B29C*
  *2791/002* (2013.01); *B29C 2945/7623*
  (2013.01); *B29L 2031/3418* (2013.01); *H04R*
  *2209/024* (2013.01); *H04R 2400/11* (2013.01)

(56)      References Cited

U.S. PATENT DOCUMENTS

| | | | | |
|---|---|---|---|---|
| 6,171,534 | B1 * | 1/2001 | Leach ................... | H04R 31/003 |
| | | | | 264/161 |
| 6,938,726 | B1 | 9/2005 | Roark | |
| 7,135,138 | B2 * | 11/2006 | Puniello ............ | B29C 45/14073 |
| | | | | 264/278 |
| 7,894,623 | B2 | 2/2011 | Mihelich | |
| 8,315,421 | B2 | 11/2012 | Mihelich | |
| 2002/0071591 | A1 * | 6/2002 | Han ......................... | H04R 9/06 |
| | | | | 381/400 |

| | | | | |
|---|---|---|---|---|
| 2003/0091685 | A1 * | 5/2003 | Tokuyama .......... | B29C 45/5008 |
| | | | | 425/550 |
| 2004/0022406 | A1 * | 2/2004 | Hutt ...................... | H04R 31/006 |
| | | | | 381/398 |
| 2004/0022408 | A1 * | 2/2004 | Mango ................. | H04R 31/006 |
| | | | | 381/431 |
| 2005/0238187 | A1 | 10/2005 | Baeten | |
| 2010/0310111 | A1 * | 12/2010 | Mihelich ............... | H04R 9/025 |
| | | | | 381/412 |
| 2012/0161549 | A1 * | 6/2012 | Sell ........................ | H04R 31/00 |
| | | | | 264/261 |
| 2013/0170676 | A1 * | 7/2013 | Itano ..................... | H04R 9/025 |
| | | | | 381/190 |
| 2018/0288552 | A1 | 10/2018 | Landemaine | |
| 2020/0211232 | A1 * | 7/2020 | Lasserre ............. | H04N 13/161 |
| 2021/0211820 | A1 * | 7/2021 | Lin .......................... | C08K 7/14 |
| 2021/0297785 | A1 * | 9/2021 | Zhang ................... | H04R 9/022 |

FOREIGN PATENT DOCUMENTS

| | | |
|---|---|---|
| DE | 1268679 B | 5/1968 |
| FR | 2789256 A1 | 8/2000 |
| GB | 1065454 A | 4/1967 |
| WO | 2008093238 A2 | 8/2008 |
| WO | 2020239766 A1 | 12/2020 |
| WO | 2021185777 A1 | 9/2021 |

* cited by examiner

Acknowledged Art

Acknowledged Art

Acknowledged Art

LOUDSPEAKER AND METHOD OF MANUFACTURE

CROSS-REFERENCE TO RELATED APPLICATIONS

This application is a U.S. National Stage Application of International Patent Application No. PCT/EP/2023/052948, filed on Feb. 7, 2023, which claims priority to United Kingdom Patent Application No. 2201815.4, filed on Feb. 11, 2022, the entire contents of all of which are incorporated herein by reference.

FIELD OF THE INVENTION

The present invention relates to an improved loudspeaker and particularly, although not exclusively, to an improved loudspeaker having an improved connection between a magnet system and a frame, and a method of manufacturing the same.

BACKGROUND

Loudspeakers are well known. An explanatory loudspeaker 1 according to an acknowledged art arrangement is shown in FIG. 1. Here, a magnet system 10 is glued to a frame 20 at glue joint 22. To reduce the cost of the loudspeaker 1, the frame 20 is often made from low-cost plastics. Such plastics often have a bad adhesion potential that affects the glue joint 22. As a result, the glue joint 22 can be weak leading to breakage or other failure during the lifetime of the loudspeaker 1. Furthermore, during manufacture of the loudspeaker, the frame and magnet system are often required to be held together whilst the glued joint 22 cures.

In more detail, the magnet system 10 is shown comprising a magnet 12 and a yoke 14. A voice coil 16 is suspended in an airgap 17 between the magnet and yoke. The magnet system generates a flux in the airgap, and the voice coil is axially driven according to an input signal and drives movement of a membrane 30 (i.e. diaphragm) as is known in the art. The magnet system 10 is also shown as including a magnet plate 18 and a spacer 19. The magnet plate 18 can also be referred to as a washer. In general, within the field, the components of the magnet system will be readily identifiable and may comprise a plurality of axially centred parts. The plurality of axially centred parts including, but not limited to, one or more steel parts, one or more magnets, one or more non-magnetic metal parts (Copper and Aluminium), and one or more other parts.

The components of the magnet system are typically glued together. For instance, as well as the glue joint 22 between the frame 20 and a distal side of the yoke 14, the spacer 19 is glued to the yoke at an interface between respective surfaces, the magnet 12 is glued to an opposed surface of the spacer 19 at an interface between the respective surfaces, and the magnet plate 18 is glued to the opposed surface of the magnet 12 at an interface between the respective surfaces. The glued interfaces of the magnet system 10 are indicated generally by g.

Glue for the glued interfaces g of the magnet system 10 needs to be placed accurately to avoid the glue entering into the airgap 17. In particular, if glue enters into the airgap 17, it can impede the movement of the voice coil 16 and affect the performance of the loudspeaker 1. Furthermore, glues require a curing time and the manufacturing process of the magnet system therefore often needs the magnet system to be held in place whilst the glue cures. In many cases, heated buffers are used to speed up the curing process. The curing of the glue during the manufacturing process of the magnet system is time consuming and also increases the area required for the manufacturing process within the manufacturing environment. That is, the glued components are moved or held at a curing station to complete the curing, and the area required for the manufacturing process is increased due to the size of the curing station required to accommodate the number of glued components.

As will be appreciated, the loudspeaker 1 may include numerous other components as is known in the art. For instance, a dust cap 41 and an outer damper 42 are shown in the explanatory example of the acknowledged art shown in FIG. 1. In this regard, the magnet system assembled to the frame to form a unitary part, may typically form a component of a loudspeaker.

A loudspeaker 1 according to an alternative acknowledged art example arrangement is shown in FIG. 2. As with FIG. 1, the loudspeaker has a magnet system 10 connected to a frame 20. However, in FIG. 2, the connection between the frame 20 and magnet system 10 includes a rivet 14r. Here, the rivet 14r is a nub or projection or the like from the yoke 14 that has a head larger than a base. The frame includes an aperture therethrough and the frame 20 is pressed fitted to insert the rivet through the aperture. It will be appreciated that the magnet system (i.e. the yoke) may include a plurality of rivets 14r spaced around the magnet system. In particular, the rivets might be arranged about a circumference. To conveniently locate the rivets, the yoke 14 is shown as having a flange 15. The flange extends radially from a main portion of the yoke (i.e. the flange is additional to the yoke of FIG. 1). This extra flange is an important cost increase. To prevent rattling (small movement between the frame and yoke), the industry often uses a combination of riveting and gluing. That is, glue g is applied to one of the interfaces between the frame and the flange 15 which adheres the respective surfaces when the frame is push fitted to the magnet system. However, by still utilising glue in the manufacturing process, the reduced performance due to poor reliability of the glued connection during the lifetime of the loudspeaker remains. As does the time and manufacturing area constraints created by the components being held at a curing station.

It has also been known to attempt to improve the connection between the magnet system 10 and frame 20 by insert moulding the frame 20 with the magnet system 10. For instance, in FIG. 3 an example according to a further alternative acknowledged art arrangement is shown wherein the frame is insert moulded over the flange 15 of the yoke 14. Insert moulding is a known manufacturing process wherein an insert (i.e. the yoke of the magnet system) is incorporated into a mould such that the moulding (i.e. frame) forms around the insert. In this case, the frame 20 is insert moulded to encapsulate a distal rim of the flange 15 and be secured thereto. The insert moulding does not require an additional glue step to connect the frame to the yoke 14. However, the other components of the magnet system are still glued together. Moreover, the additional components of the magnet system are glued to the yoke at a downstream process, where the additional size of the yoke connected to the frame (as opposed to the yoke) increases the issues with the area of the manufacturing environment required for the gluing step and the subsequent curing station.

The present invention has been devised in light of the above considerations. In particular, it is an aim to provide a loudspeaker having an improved connection between the magnet system and the frame. For instance, by reducing the amount of glue in the manufacturing process.

SUMMARY OF THE INVENTION

According to an exemplary aspect there is therefore provided a loudspeaker, and in particular, a component of a loudspeaker, wherein a frame is moulded with a magnet system such that the frame extends through an aperture in the magnet system. Advantageously, by moulding the frame to extend as a single piece through an aperture in the magnet system, the frame can be attached to the magnet system without glue. In the exemplary embodiments, the aperture in the magnet system extends axially from one side to another (i.e. from a first side to a second side). Here by forming the frame to axially-key to the magnet system, the frame can form a mechanical coupling to the magnet system. Advantageously, with the frame configured to extend through the aperture and to axially-key to the magnet system, it is possible to reduce the problems discussed above and associated with one or more of holding the assembly at a curing station, the use of jigs to maintain alignment of parts whilst glue cures, or the space associated in the manufacturing environment. For instance, by reducing or even removing the need to glue an interface between the frame and magnet system, there is a reduced need, or even no need at all, to hold the assembly at a curing station. Moreover, by reducing or even removing the need to glue interfaces between components of the magnet system, there is a reduced need, or even no need at all, to hold the assembly at a curing station. For instance, even in the instance where some glue is used, by forming the frame to extend through the aperture and axially-key to the magnet system, the frame can be used to maintain the alignment of the magnet system whilst any glue cures. Moreover, by forming the frame to extend through the aperture and axially-key to the magnet system, the connection between the frame and magnet system is improved.

In the exemplary embodiments, the frame is configured with a first axial-key and a second axial-key, where the first axial-key restricts relative movement between the magnet system and the frame in a first axial direction and the second axial-key restricts relative movement between the magnet system and the frame in a second axial direction. Here, the magnet system comprises a plurality of components comprising at least an upper part and a lower part. Where upper and lower are used as relative terms in relation to an axis of the loudspeaker. The first axial-key is formed between the upper part and the frame. The second axial-key is formed between the lower part and the frame.

In exemplary embodiments, the frame is formed to axially-key to the magnet system by being configured to extend over the opening. That is, the aperture in the magnet system extends between a first surface and a second surface of the magnet system. For instance, suitably, the first surface and the second surface are on opposed sides of the magnet system. By the frame extending over at least a portion of the first surface (e.g. an upper surface or a lower surface), the frame extends over the aperture and securely connects the frame and magnet system. The first surface can be orthogonal to the opening. For instance, if the opening is formed in a planar surface, the first surface is a portion of the planar surface. Here, the portion of the frame that extends over the portion of the planar surface is proud of the planar surface. Alternatively, the first surface can be formed in a recess wherein the frame is configured to fill the recess. Here, a portion of the recess is larger than the aperture, such that the frame being formed in the recess extends over a portion of the first surface. The frame can therefore be formed without being proud of the magnet system's surface that the recess is formed in. It will be appreciated that in embodiments including a second axial-key, the frame is suitably formed to axially-key to the magnet system by being configured to extend over the other opening. That is by extending over at least a portion of the second surface (e.g. the other of the upper surface or the lower surface). Here the second-axial key is as described with the first axial-key wherein reference to the first surface is a reference to the second surface (i.e. the respective surface).

In exemplary embodiments, the frame is moulded by clamping the magnet system in a mould. Here, the frame does not extend entirely across either the first or opposed second side as otherwise it is not possible to clamp the magnet system in the mould in an axial direction of the aperture. Thus, the frame exposes in an axial direction at least a portion of the first side and at least a portion of the second side.

The exposed portion of the first side and the exposed portion of the second side being axially opposed and configured so that a first mould piece and a second mould piece can contact the respective exposed portions and clamp the magnet system in the axial direction of the aperture.

In the exemplary embodiments, the magnet system comprises at least a yoke and the aperture extends through the yoke. That is, the frame is moulded as a single piece to extend through an aperture in the yoke. Whilst it is envisaged the aperture in the yoke may in some embodiments correspond to the aperture through the magnet system (that is, the frame does not extend through other components of the magnet system), in particularly suitable exemplary embodiments, the aperture in the yoke is a portion of the aperture through the magnet system. In other words, the aperture through the magnet system may be formed from an aperture through the yoke and at least one further aperture in a further component of the magnet system. Wherein the aperture in the yoke is aligned with the and each further aperture in the further components of the magnet system. Here, the frame extends through the aperture in the yoke and the aperture through the or each further component. Consequently, the opposed surfaces between which the aperture extends are respectively formed on the yoke and the further component. By extending over the apertures, the frame holds the yoke and further component in place. Thus, the need to glue the components of the magnet system is reduced. By reducing the need to glue the components of the magnet system to each other, the loudspeaker can be manufactured more efficiently, in particular, because there is a reduced need, even no need at all, to hold the components at a curing station.

In the exemplary embodiments where the aperture through the magnet system is formed from separate apertures through a plurality of components of the magnet system, suitably the magnet system comprises at least three components. Each component has an aperture. Here, the at least three components are concentrically arranged. The three components being arranged in order axially and so that the component sandwiched between the other two components has a maximum axial dimension that is smaller than the minimum axial dimension of the other components. For instance, where one of the other components is a yoke (i.e. the first component of the three components is a yoke), the component spaced axially-furthest from the yoke (i.e. the third component, where the second component is sandwiched between the yoke and third component) is sized to extend radially nearer the yoke than the second component. With the middle of the three components being sized to be axially smaller than the other two components, it is not possible to mould the frame where the middle component is aligned in the mould using its outer dimension and a portion of a mould part that withdraws axially to the aperture as the undercut between the middle component and outer component would prevent withdrawal.

According to an exemplary aspect, there is therefore further provided a method of manufacturing a loudspeaker and in particular a component of a loudspeaker. The method comprises insert moulding a frame with a magnet system, wherein the frame is moulded to extend through an aperture in the magnet system. In the exemplary methods, the frame is moulded to extend through the magnet system and to extend from one side to another. Here by forming the frame to axially-key to the magnet system, the frame can form a mechanical coupling with the magnet system. Advantageously, with the frame configured to extend through the aperture and to axially-key to the magnet system, it is possible to reduce the problems discussed above. For instance, by reducing or even removing the need to glue an interface between the frame and magnet system, there is a reduced need, or even no need at all, to hold the assembly at a curing station. Moreover, by reducing or even removing the need to glue interfaces between components of the magnet system, there is a reduced need, or even no need at all, to hold the assembly at a curing station. For instance, even in the instance where some glue is used, by forming the frame to extend through the aperture and axially-key to the magnet system, the frame can be used to maintain the alignment of the magnet system whilst any glue cures. Moreover, by forming the frame to extend through the aperture and axially-key to the magnet system, the connection between the frame and magnet system is improved.

In the exemplary embodiments, the axial-key may be a first axial-key. As explained above, there may be a second axial-key. In some embodiments, the first axial-key, the second axial-key or the first and second axial-keys are suitably formed by forming the frame to extend over the respective opening. That is, the method comprises providing a magnet system with an aperture that extends between a first surface and a second surface of the magnet system. For instance, suitably, the first surface and the second surface are on opposed sides of the magnet system. The exemplary embodiments comprise arranging the magnet system in a mould and subsequently moulding the frame by filling the mould with material. For instance, suitably the mould can be closed and injected with material as is known in the art. By moulding the frame to extend over at least a portion of the respective surface, the frame extends over the aperture and securely connects the frame and magnet system. The method comprises moulding the loudspeaker, and in particular the component of the loudspeaker, as herein described. Consequently, in one exemplary embodiment, the method comprises forming the frame to extend over the opening at each side of the aperture. That is, the frame extends over at least a portion of the first surface and at least a portion of the second surface.

In the exemplary methods, the magnet system comprises at least a yoke and the method comprises arranging at least the yoke in the mould before filling the mould to form the frame to extend through the aperture in the yoke. That is, the frame is moulded as a single piece to extend through an aperture in the yoke. Whilst it is envisaged the aperture in the yoke may in some embodiments correspond to the aperture through the magnet system (that is, the frame does not extend through other components of the magnet system), in particularly suitable exemplary methods, the aperture in the yoke is a portion of the aperture through the magnet system. In other words, the aperture through the magnet system may be formed from an aperture through the yoke and at least one further aperture in a further component of the magnet system. Wherein the aperture in the yoke is aligned with the and each further aperture in the further components of the magnet system. Here, the exemplary methods suitably comprise arranging the yoke and the or each further component in the mould and aligning the yoke and the or each further component before subsequently moulding the frame to extend through the aperture in the yoke and the aperture through the or each further component. Consequently, the surfaces between which the aperture extends are respectively formed on the yoke and the further component. By extending over the apertures, the frame holds the yoke and further component in place. Thus, the need to glue the components of the magnet system is reduced. By reducing, or even excluding, the need to glue the components of the magnet system to each other, the loudspeaker can be manufactured more efficiently, in particular, because there is a reduced need, or even no need at all, to hold the components at a curing station.

In particularly suitable exemplary methods, the mould includes an insert pin and the step of arranging the magnet system in the mould comprises inserting the insert pin into the aperture of the magnet system. The method then further comprises clamping the magnet system in the mould and subsequently withdrawing the insert pin from the aperture before moulding the frame. In the exemplary methods wherein the frame is insert moulded to extend through the yoke and one or more further components of the magnet system, the alignment between the yoke and the or each further component of the magnet system is achieved using the insert pin of the mould. That is, the method comprises arranging an insert pin in a mould piece and the step of arranging the yoke in the mould comprises inserting the insert pin into the aperture of the yoke. Advantageously, the insert pin is able to be used to align the yoke in the mould. Moreover, the step of arranging a further component in the mould comprises inserting the insert pin into the aperture of the further component. Advantageously, the insert pin is able to act as an alignment tool to align the components of the magnet system. By clamping the aligned components of the magnets system in the mould, withdrawing the insert pin from the apertures and then moulding the frame to extend through the aligned apertures of the components, the alignment of the magnet system can be obtained and fixed in a single moulding step.

According to an exemplary aspect, there is therefore yet further provided a mould for use in a moulding process of a loudspeaker's frame. The mould includes an insert pin arranged within the mould to move between a first position and a second position. In the first position, the insert pin is configured to extend into a cavity of the mould. And in the second position, the insert pin is withdrawn from the cavity such that the space from which the insert pin is withdrawn defines an extension of the cavity through the aperture in a magnet system that is arranged within the cavity. The mould is closable to clamp the magnet system such that the insert pin acts as a jig to align the magnet system prior to being clamped, and then withdraws from the magnet system to define an extension of the cavity though the magnets system. When the cavity is filled with material, a frame can therefore be insert moulded with the magnet system and such that the frame is formed in a single piece and to extend through the aperture of the magnet system.

In the exemplary moulds, the frame is moulded to extend through the magnet system and to extend from one side to another. Here, by forming the frame to axially-key to the magnet system, the frame can be securely connected to the magnet system. Suitably the mould can be closed and injected with material as is known in the art. Thus, in exemplary moulds the mould comprises a first mould part and a separable second mould part that define a cavity when clamped together in a draw direction (that is, an axial direction of the aperture). The magnet system is able to be arranged within one of the first mould part or the second mould part. Where the magnet system comprises a plurality of components such that the aperture is a combination of discrete apertures through the plurality of parts, the plurality of components can be arranged within one of the first mould or the second mould, or one or more of the components can be arranged in the first mould part and one or more components can be arranged in the second mould part. Either way, after bringing the mould parts together in the axial direction, the insert pin is inserted into the aperture(s) to align the magnet system or the plurality of components of the magnet system. Suitably, clamping the first mould part and the second mould part clamps the magnet system. That is, the first mould part abuts an exposed portion of the first surface of the magnet system and the second mould part abuts an exposed portion of the second surface of the magnet system, and by urging the first mould part relatively towards the second mould part in the axial direction of the aperture, the magnet system is clamped between the respective abutments in the axial direction during the moulding process. The insert pin can be in either the first mould part or the second mould part. Here, suitably, when the insert pin is withdrawn, the empty aperture that the insert pin took up connects a void in one or both mould parts. The or each void forming part of the cavity. Thus, when the cavity is filled, the or each void is filled to cause the mould to extend over a respective surface adjacent the opening to the aperture. It will be appreciated that the mould cavity can be shaped according to the required shape of the frame being moulded. Moreover, whilst the first mould part may be termed a fixed mould part and the second mould part may be termed a moveable mould part in order to separate the mould and release the moulded assembly (i.e. magnet system insert moulded to frame), the references are not limiting to the mould parts and the mould parts can be configured as is known in the art. For instance, in some instances, the first mould part could be referred to as an injection mould and the second mould part may be referred to as an ejection mould. Also, as is known in the art, the first mould part and/or the second mould part may include moveable inserts and the like. Here, the respective abutments on the magnet system may be an insert or further mould piece moving in the axial direction.

According to the exemplary embodiments, the loudspeaker, and in particular the loudspeaker component, is a speaker assembly, wherein the magnet system is mounted to a single piece frame such that the frame extends through the aperture in the magnet system and to axially-key to the magnet system. Suitably, the frame axially-keys to the magnet system by extending over at least a portion of the first surface adjacent the first side of the aperture; and optionally over at least a portion of the second surface adjacent the second side of the aperture. Suitably, the frame exposes a portion of a first side of the magnet system having an exit from the aperture. Suitably, the frame exposes a portion of a second side of the magnet system having an exit from the aperture. The frame exposes a portion of the first surface. The frame exposes a portion of the second surface. The portion of the first surface and the portion of the second surface are opposed in an axial direction of the aperture. Here, suitably, the first surface can be one of an upper or lower surface and the second surface can be the other of the upper or lower surface. Furthermore, the first surface and the second surface can be the same first and second surface that in some embodiments the frame extends over. That is, where the respective surface is planar. However, in embodiments, where the aperture is a recess, the respective opposed portions of the first and second surfaces can be angled or stepped to the respective first or second surface over which the frame extends to axially key the frame and magnet system.

Within the field of loudspeakers, the frame will be readily identifiable. Here, as will be appreciated, the frame of a speaker assembly is used to suspend a membrane that vibrates to produce sound, wherein the movement is induced by the magnet system. The frame also acts as a mounting for other components of the speaker assembly, including the magnet system. It will be appreciated that a forward portion of the frame (i.e. the portion of the frame that extends forward of the magnet system relative to the direction of movement of a connected diaphragm) can be of any suitable shape and design as is known in the art. It will be appreciated that the frame moulded to the magnet system may therefore be a manufactured as a unitary component of the loudspeaker to which further components are assembled to form the loudspeaker. Thus, herein references to methods of injection moulding may comprise further method steps as is known in the art to assemble or connect further components of the speaker assembly in order to assemble the loudspeaker. Whilst it is envisaged that the frame may be manufactured as a unitary component with the magnet system (that is the frame is a single piece) it is envisaged further frame components might be connected to the single piece frame. For instance, the single piece frame that is injection moulded through the aperture, might be connected to further frame components in a downstream assembly process. Here, the single piece frame may be moulded with connectors or tags or the like for connecting to the further frame components.

In some of the exemplary embodiments, suitably the aperture through the magnet system is substantially straight. Moreover, the first surface may be orthogonal to a general axis of the opening. The second surface may be orthogonal to the general axis of the opening. And in some embodiments, the first surface and the second surface are generally parallel to each other. However, it is envisaged the aperture may also extend between non-parallel openings. For instance, the aperture may include an elbow within the magnet system, and in particular within one of the components of the magnet system.

Here, one of the axial-keys may be extension of the frame through the elbow. In other embodiments, a straight aperture between two parallel apertures may include a junction comprising a branch of the frame, where the branch connects portions of the frame forming the respective the axial-keys and a portion of the frame to which the diaphragm is attached.

In the exemplary embodiments the magnet system comprises at least a yoke. Suitably, the aperture is formed through the yoke. Here, it will be appreciated that the magnet system may comprise further parts not combining with the aperture through the yoke such that the aperture extends through the magnet system by virtue of extending through the yoke. However, in particularly exemplary embodiments, the magnet system comprises a yoke and at least one further part. Here, the aperture is formed by aligning an opening through the yoke with an opening through said at least one further part. In other embodiments, the magnet system comprises a yoke and a plurality of further parts, wherein the aperture is formed by aligning an opening in the yoke with an opening in each further part. The further parts may comprise a magnet and/or a magnet plate, and/or a spacer and/or further parts as is known in the art. For instance, in one embodiment, the magnet system comprises a yoke and a magnet. Both the yoke and magnet have a respective opening formed therethrough. The aperture is formed by aligning the opening in the yoke and the magnet. It will be appreciated that the magnet system may comprise further parts not combining with the respective openings in the yoke or magnet such that the aperture extends through the magnet system even though it does not extend through every part of the magnet system.

In exemplary embodiments comprising a yoke, suitably the yoke forms a cup-shape wherein the magnet system is arranged inside the cup-shape yoke. Such cup-shaped yokes are known in the art as U-yokes. Here, as will be appreciated, the magnet system suitably may comprise a cylindrical assembly as is known in the art. Here, the opening in the or each part of the magnet system is suitably a central opening. That is the central opening is suitably an opening through the respective part aligned with a centre axis of the magnet system. The openings can have any shape, but it is envisaged circular opening will be practical as currently employed. Indeed, the aperture through the magnet system through which the single piece frame is moulded to extend is suitably able to utilise an aperture present in known magnet systems. In embodiments where the openings through the respective parts of the magnet system are a consistent size, the formed aperture can be a constant cross-section along the length of the opening. However, it is possible for one or more of the openings to be a different size and therefore the section of the frame that extends through the aperture can have a varying cross-section along its length.

In some embodiments having a U-yoke, the U-yoke may include an extension flange that extends axially to form a distal end of the U-yoke. Here, the frame can be moulded to encapsulate a portion of the yoke. For instance, the frame can be moulded to encapsulate the distal end of the flange.

In particularly suitable embodiments having a U-yoke, the frame is formed to extend from one surface (i.e. a front surface relative to a diaphragm's movement) of the magnet system, around an opposed second surface (i.e. a rear surface relative to a diaphragm's movement) before extending through the aperture. That is, suitably, the single piece frame extends around the back of the yoke before extending through the aperture from back to front. Here, the frame terminates at an extension that extends over a front face of the magnet system.

In the embodiments wherein the frame extends around a back of the magnet system, the frame suitably comprises ribs that connect a forward portion of the frame with a rearward portion of the frame. The ribs reduce the amount of material of the frame formed around the magnet system and therefore reduces the thermal insulation of the magnet system generated by the frame (i.e. the cooling of the magnet system is improved). That is, the ribs extend at spaced arrangements around the magnet system to create large gaps in the frame as it extends around the magnet system (for instance along the sides of the yoke). As compared to a frame without ribs (e.g. a substantially solid wall) the large gaps generated by the formed ribs reduce the thermal mass around the magnet system and improve the cooling of the magnet system.

A known alternative to a U-Yoke is a T-yoke, where the magnet system is arranged on an outside of the yoke. Again, T-yokes are known in the art and typically comprise a central tubular section and a radial flange that extends outwardly upon which the magnet system is mounted. Here, the opening through the magnet system may comprise a plurality of discrete openings through the magnet system. For instance, the T-yoke may include a plurality of openings that form a plurality of discrete apertures. Suitably, the plurality of opening may be arranged about a circumference and generally at an equal spacing. For instance, there may be between three and eight openings or between four and six openings. Suitably, the T-yoke includes a radial flange and the openings are formed in the radial flange. In exemplary embodiments wherein the aperture is formed in the yoke and one or more further parts, a plurality of openings are formed in the one or more further parts so as to be aligned with each opening in the yoke. Typically, the further parts are each substantially ring-shaped, but it is envisaged one or more of the further parts may be non-ring shaped (for instance one of the furthers parts could be a square washer). Here, the openings in the further parts are suitably arranged at a middle of the respective part. The openings can have any shape, but it is envisaged circular opening will be practical. In embodiments where the openings through the respective parts of the magnet system are a consistent size, the formed aperture can have a constant cross-section along the length of the opening. However, it is possible for one or more of the openings to be a different size and therefore the section of the frame that extends through the aperture can have a varying cross-section along its length.

In embodiments having a T-yoke, the frame can suitably be formed to extend through the aperture from one surface (i.e. a front surface relative to a diaphragm's movement) of the magnet system to an opposed second surface (i.e. a rear surface relative to a diaphragm's movement). That is, suitably, the single piece frame extends from a forward portion of the frame along a front surface of the magnet system and through the aperture from front to back. Here, the frame terminates at an extension that extends over a rear face of the magnet system.

As will be appreciated, in the exemplary embodiments, the speaker assembly comprises further components as is known in the art. For instance, a complete speaker assembly may include one or more of a dust cap, an inner/outer diffuser glued to frame, a voice coil, a membrane, and the like.

As will be appreciated, the exemplary methods of manufacturing a loudspeaker, and in particular the loudspeaker component, may comprise manufacturing the speaker assembly. For instance, via a method of injection moulding. Thus, according to exemplary embodiments, there is provided a method of injection moulding a speaker assemblies frame, the method comprising: providing a magnet system having an aperture from a first side to a second side; arranging the magnet system in a mould with an insert pin of the mould inserted into the aperture; clamping a first mould part and a separable second mould part together to form a mould cavity and to clamp the magnet system; withdrawing the insert pin from the aperture in the magnet system to extend the cavity through the aperture in the magnet system and to axially key to the magnet system; and injecting material into the cavity. Suitably, the axial key is formed by providing the mould cavity to form the frame over at least a portion of a first surface adjacent a first side of the aperture and optionally over at least a portion of a second surface adjacent a second side of the aperture.

As explained, the speaker assembly may be as herein described and the exemplary embodiments may therefore comprise manufacturing the speaker assembly as herein described. Thus, the method may comprise forming the mould cavity appropriate to mould the desired frame. For instance, if the frame is formed with ribs, the method suitably comprises forming a mould cavity defining ribs and injecting material into the cavity to form the ribs. And here, the position of the various features in the mould is generally apparent form a description of the speaker assembly. Thus, where it is not explicitly said, a disclosure herein of the speaker assembly having a feature is also a disclosure of the mould cavity and method having the required shape to achieve the moulded frame.

In the exemplary methods, the step of clamping the first mould part and second mould part together clamps the magnet system in the mould. Here, the insert pin can suitably be used as a jig to align the magnet system in position relative to the formed frame. Thus, the method comprises aligning the magnet system to the insert pin and the step of clamping the first mould part clamps the magnet system to maintain the position of the magnet system during the subsequent moulding steps. Once the frame has been moulded, the portion of the frame that extends through the aperture in combination with the axial-key (i.e. parts of the frame that extends over the surfaces adjacent openings to the aperture), maintains the alignment of the magnet system relative to the frame. When the magnet system comprises one or more further parts that have an opening aligned with an opening in the yoke to form the aperture, the method comprises clamping each of the parts in a sandwich and using the insert pin to align the further parts of the magnet system. In some exemplary methods, further parts of the mould (i.e. the first mould part or second mould part, or moveable parts thereof) can be used to align one or more of the further parts or to assist in the alignment.

In some exemplary embodiments, the aperture through the magnet system of the loudspeaker assembly comprises a plurality of discrete apertures. For instance, when the speaker assembly comprises a T-yoke. Here, the method step in the exemplary embodiments of inserting and withdrawing an insert pin (and aligning the magnet system with the insert pin) embody a step of inserting and withdrawing respective multiple insert pins. In embodiments comprising multiple insert pins, the step of withdrawing the insert pin from the aperture in the magnet system to extend the cavity through the aperture in the magnet system and over at least a portion of the first surface adjacent the first side of the aperture and optionally over at least the portion of the second surface adjacent the second side of the aperture comprise withdrawing the plurality of insert pins and extending the cavity over portions of the first surface and second surface adjacent each aperture. In some embodiments, a first set of one or more of the multiple insert pins is independently moveable to a second or further set of one or more of the multiple insert pins. Here the method can comprise withdrawing the first set and injecting a first material and subsequently withdrawing the second set and injecting a further material. Here, the further material may be different to the first material. In embodiments where a first material is injected in a first step and a second material is injected as a further step, the frame would still be a single piece even if the further material is a different material, where the first material and second material bond together before the frame is demoulded or are otherwise interlocked or the like to demould a unitary component.

As explained, exemplary embodiments include a mould for injection moulding the loudspeaker assembly, and in particular the loudspeaker component, and for completing the manufacturing method of injection moulding the loudspeaker assemblies frame as herein described. Thus, according to exemplary embodiments, there is provided a mould for Injection moulding a frame for a speaker assembly, wherein: the mould comprises a first mould part and a separable second mould part that define a cavity when clamped together in a draw direction; and when clamped together, the first mould part and second mould part are configured to clamp a magnet system within the mould; characterised in that the mould includes an insert pin arranged to move between a first position and a second position, wherein, in the first position, the insert pin is configured to extend into an aperture of the magnet system so as act as a jig to align the magnet system prior to being clamped by the first and second mould parts, and in the second position, the insert pin is withdrawn from the magnet system such that the magnet system and insert pin define an extension of the cavity through the aperture in the magnet system and so that the frame axially-keys with the magnet system. For instance, the cavity can be configured to cause the frame to be moulded over at least a portion of a first surface adjacent a first side of the aperture and optionally over at least a portion of a second surface adjacent a second side of the aperture.

As explained, the speaker assembly and in particular the speaker assembly component may be as herein described and the exemplary embodiments may therefore comprise a mould suitable for injection moulding the speaker assemblies frame as herein described. Thus, the mould may comprise a mould cavity appropriate to mould the desired frame. For instance, if the frame is formed with ribs, the mould suitably comprises a mould cavity defining ribs. And the position of the various features in the mould is generally apparent form a description of the speaker assembly. Thus, where it is not explicitly said, a disclosure herein of the speaker assembly having a feature is also a disclosure of the mould cavity and method having the required shape to achieve the moulded frame.

In exemplary mould embodiments, the insert pin is a single discreet insert pin. For instance, when the magnet system comprises a U-yoke, and the single discrete insert pin is arranged along a central axis of the magnet system. However, in alternative embodiments, the insert pin may be formed by a plurality of discrete insert pins. For instance, when the magnet system comprises a T-yoke and the aperture through the magnet system comprises a plurality of discrete apertures. The or each insert pin can be independently moveable relative to both the first mould and the second mould. Optionally, a plurality if insert pins are provided. Suitably, the plurality of insert pins can be movable as a set or one insert pin can be independently moveable relative to another as required.

Suitably, the or each insert pin may have a constant cross-section along the length of the insert pin. For instance, where the aperture through the magnet system has a constant cross-section along its length. It will be appreciated, the shape of the or each insert pin can be configured to match the shape of the aperture. In particular, the insert pin may have a non-constant cross-section along the length of the pin. For instance, if the opening in a part of the magnet system closer to a distal end of the insert pin is smaller than an opening in another part further from the distal end, a portion of the insertion pin corresponding to the part closer to the distal end can have a smaller cross-section than a portion of the insertion pin corresponding to the location of the part further from the distal end. Here, the or each insertion pin may have one or more steps in the size of the cross section along its length. In some embodiments, the openings in the magnet system are not sequentially smaller so that configuring the insertion pin to correspond in size at respective portions along its length to the openings would prevent the insertion pin from being correctly inserted, and in these embodiments, further inserts or moveable inserts of the mould can be used to align one or more of the parts of the magnet system. Likewise, the mould may include nibs in the cavity that project through the moulded frame, for instance to support the magnet system when installed within the mould. In some embodiments of the insert pin, the insert pin has a length longer than aperture through the magnet system. Here, a first portion of the length can be used as a jig to assemble the magnet system and withdrawing the insert pin comprises withdrawing that portion. Rather than being fully withdrawn from the magnet system, a second portion of the length of the insert pin having a smaller cross-section to the first portion may remain within the aperture, such that the portion of the frame extending through the aperture is moulded as a hollow part.

In the exemplary embodiments, it is envisaged the or each opening in the parts of the magnet system that form the aperture have a circular cross-section. Here, the insertion pin is also envisaged as being suitably circular in cross-section. In any case, it is envisaged the shape of the insertion pin will match the shape and size of the openings (bearing in mind tolerances that allow the insertion pin to align and be inserted and withdrawn from the opening). In instances where the orientation of the magnet system is limiting (i.e. where the magnet system is correctly arranged relative to the frame at a fixed orientation or orientations about a central axis of the magnet system) the or each insertion pin may suitably have a non-circular cross-section. Here, the discrete aperture or each discrete aperture is envisaged as having a corresponding non-circular cross section. Consequently, the non-circular shape can provide rotational alignment of the magnet system within the frame. For instance, the magnet system can only be inserted into the mould by inserting the insertion pin into the aperture in defined orientations of the magnet system. The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

Figure 9:
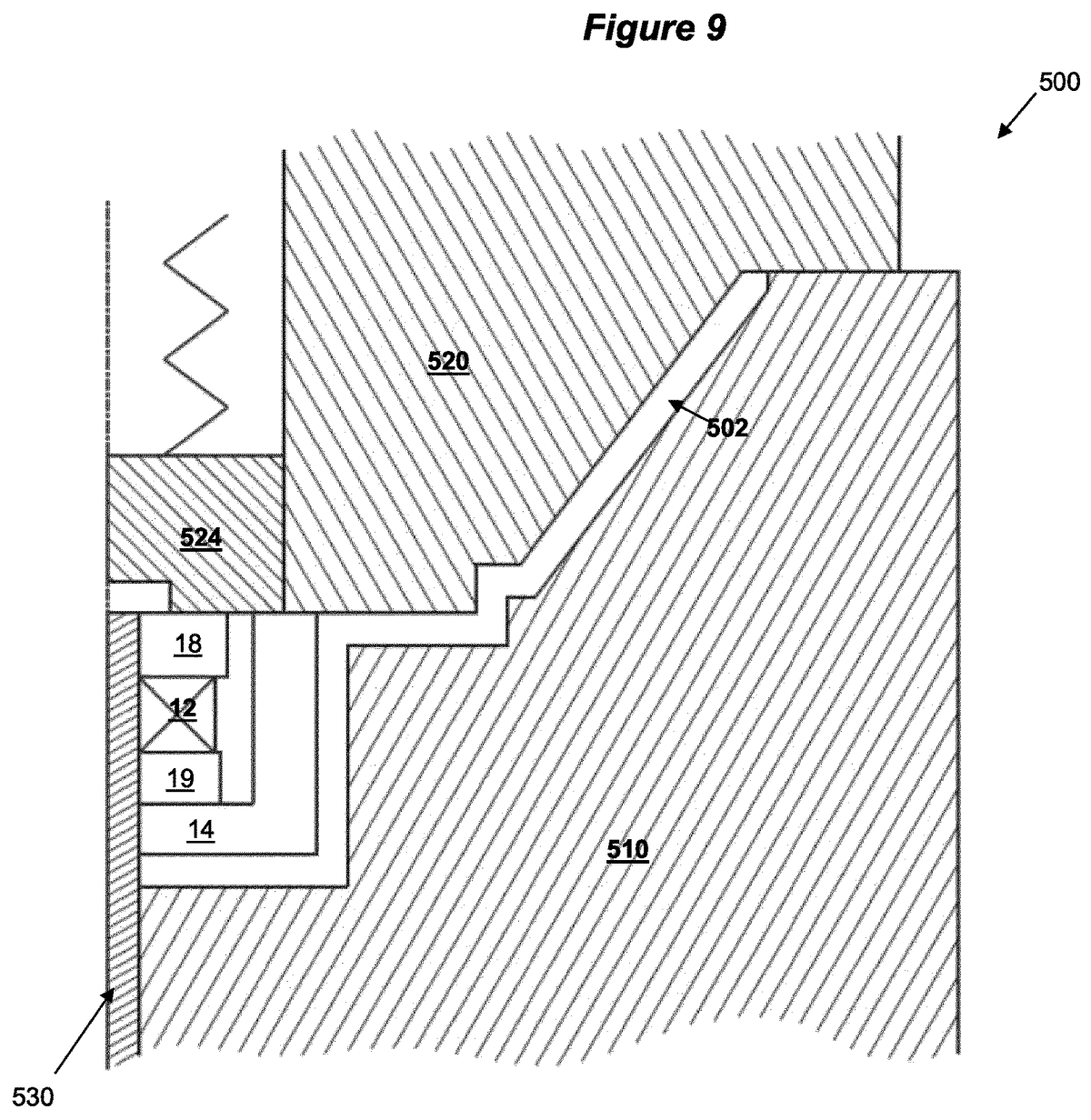

FIG. 9 shows a half section view through an alternative manufacturing mould for use in a process of manufacturing the loudspeaker component of FIG. 4 and with a magnet system arranged in the mould;

DETAILED DESCRIPTION OF THE INVENTION

Aspects and embodiments will now be discussed with reference to the accompanying figures. Further aspects and embodiments will be apparent to those skilled in the art. Further, it will be appreciated that the cross-section shown in FIGS. 4, 5, and 7 to 16 show one side of a centre line.

Figure 1:
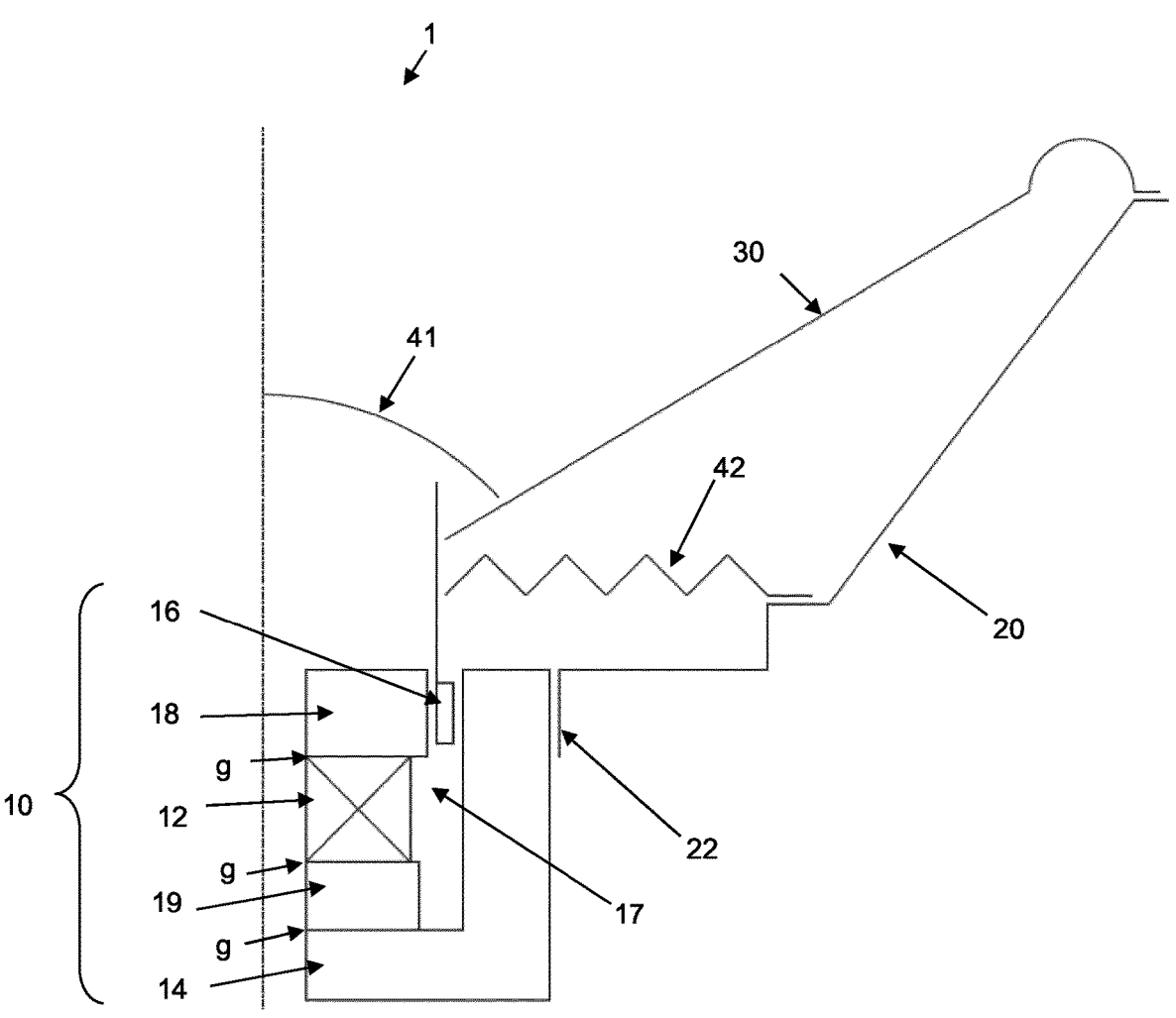
FIG. 1 shows a half section view through a loudspeaker according to an acknowledged art arrangement for example purposes.
Figure 2:
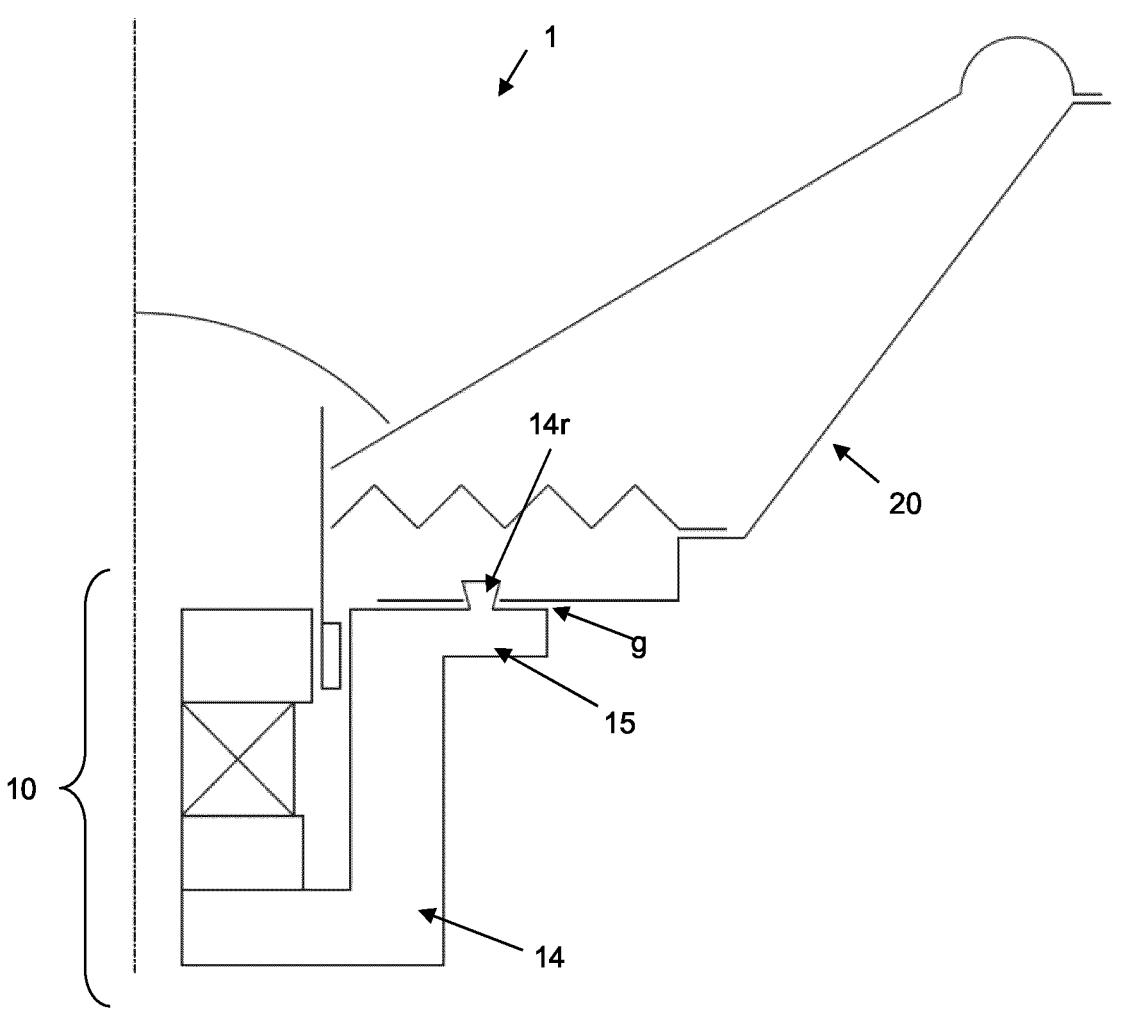
FIG. 2 shows a half section view through a loudspeaker according to an alternative acknowledged art arrangement for example purposes.
Figure 4:
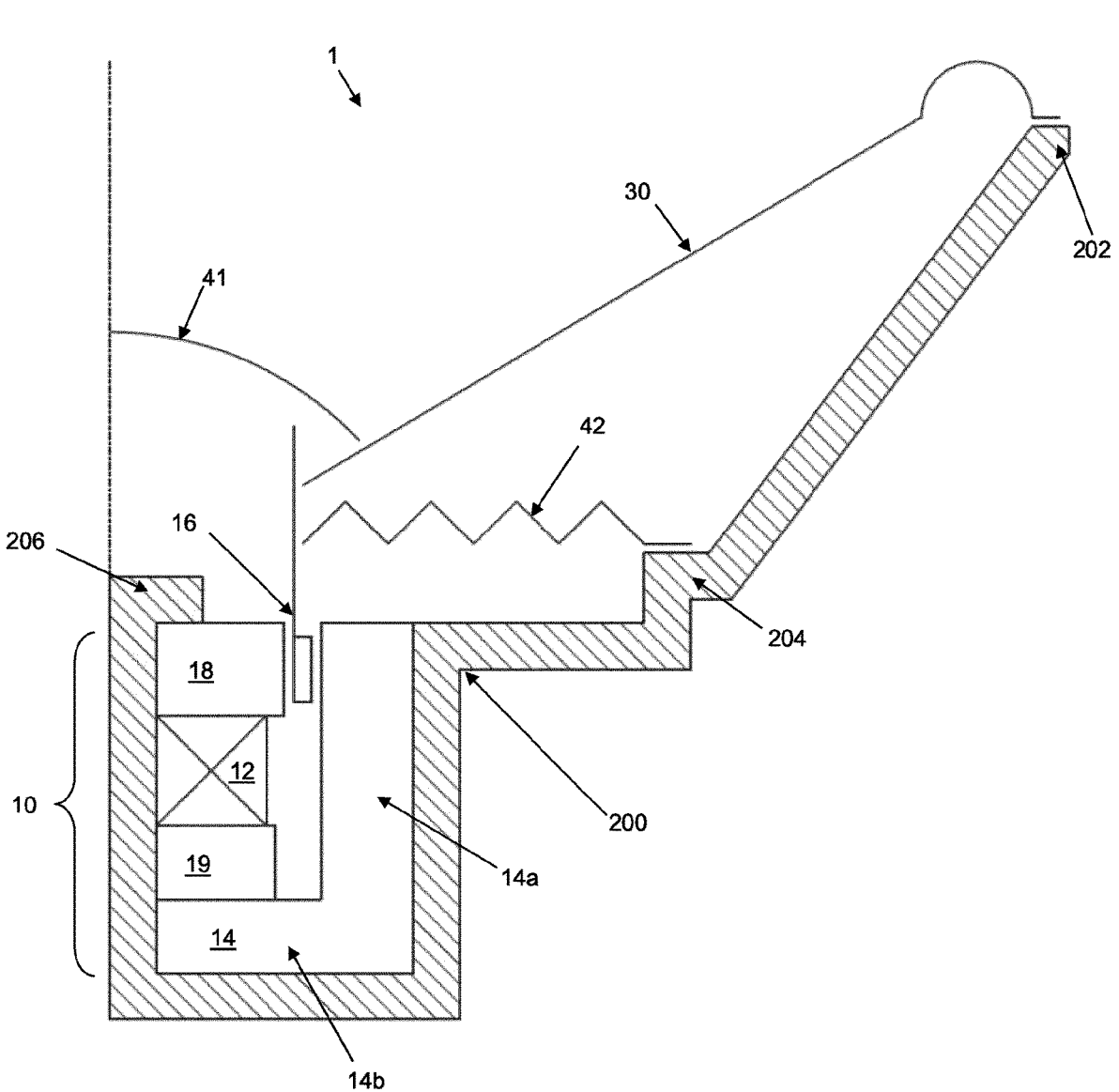
FIG. 4 shows a half section view through a loudspeaker according to an exemplary embodiment.

Referring to FIG. 4, an exemplary speaker assembly 1 is shown comprising a magnet system 10 connected to a frame 200. As herein described, other than the frame 200, the components of the speaker assembly 1 are substantially in accordance with the acknowledged art embodiment depicted in FIG. 1 and will be readily understood within the field. A detailed explanation of the components and operation of the speaker assembly 1 is not therefore considered necessary. However, briefly, the speaker assembly 1 is arranged to produce a sound by causing a membrane 30 (e.g. a diaphragm) to vibrate to produce an audible sound. The diaphragm has a listener side exposed to a front of the speaker assembly. The opposed side of the diaphragm to the listener side might be termed a rear side. Suitably, the diaphragm has a cone shape and is designed to be lightweight and with the surface area of the diaphragm maximised. The diaphragm may be formed from pressed paper or the like as is known in the art. For instance, in exemplary speaker assemblies, the diaphragm may be a single (monolithic) piece of material. The material forming the diaphragm is suitably lightweight, for instance, the material suitably has a density of 0.5 g/cm3 or less. In exemplary embodiments, the material is extruded polystyrene or extruded polypropylene or similar. In some examples, the diaphragm is covered by a skin, e.g. to protect the diaphragm. Suitably, the skin is formed from paper, carbon fibre, plastic foil, or the like. In some exemplary embodiments, the diaphragm includes several pieces of material attached together. For instance, the diaphragm includes several pieces of material attached to each other by glue. Here, the diaphragm may include a first cone and a second cone being first and second pieces attached together, wherein suitably the first and second cones are glued back to back to attach each cone to the other cone. Here, a front surface of one of the cones forms the first radiating (e.g. front) surface and a back surface of the other cone provides a second radiating (e.g. rear) surface. The diaphragm is connected to the frame 200 towards a distal edge 202 of the frame 200 and suspended therefrom.

In the exemplary embodiments a motor system of the loudspeaker assembly suitably includes an electromagnetic drive unit that includes the magnet system 10 configured to produce a magnetic field, and a voice coil 16 attached to the diaphragm and suspended in a gap in the magnet system created between a yoke 14 and magnet 12 of the magnet system 10. In use, the voice coil may be energized (have a current passed through it) to produce a magnetic field which interacts with the magnetic field produced by the magnet unit and which causes the voice coil (and therefore diaphragm) to move relative to the magnet unit. The magnet unit may include a permanent magnet. As explained, the magnet is configured to provide an air gap between the magnet and the yoke, and is configured to provide a magnetic field in the air gap. The voice coil 16 is configured to sit in the air gap when the diaphragm is at rest. Such motor systems are well known.

In FIG. 4, as well as the magnet 12 and yoke 14, the magnet system 10 is shown as comprising a magnet plate 18 and a spacer 19. A damper 42 is provided between the frame 200 and the membrane 30 and a dust cap 41 is arranged to cover a central hole in the membrane 30.

The frame 200 is formed as a single piece, and as explained herein is preferably injection moulded in a single step. The frame 200 has a forward portion that extends forwards from the magnet system 10 and includes a distal end 202. In the embodiments shown, the distal end 202 is circular, but as is known in the art other shapes can be employed such as elliptical or race-track. The membrane 30 is attached and suspended generally at the distal end 202. The forward portion includes a shelf 204 to which the damper 42 is attached. The forward portion is shown extending from a side of a distal portion of the magnet system's yoke 14. It will be appreciated the forward portion may be configured as is required and known in the art. In FIG. 4, the yoke 14 is shown as a U-yoke design wherein the yoke 14 resembles a cup having a circumferential wall 14a and a radial wall 14b. The radial wall 14b closes the circumferential wall 14a. Here, the frame 200 includes a rear portion that is shown as extending around the yoke, that is over the circumferential wall 14a and radial wall 14b, and then extending through the magnet system 10. Here, the magnet system 10 includes an aperture through the centre of the magnet system. The aperture is formed by a combination of openings in the yoke 14, spacer 19, magnet 12, and magnet plate 18. The frame 200 terminates at a front of the magnet system at a head 206. The head 206 extends over a front surface of the magnet system 10. As shown, as the forward most component, the head 206 extends over the surface of the magnet plate 18. That is, the head 206 extends over the surface about the exit to the aperture in the magnet assembly 200. Here, because the frame also extends over a rear surface of the magnet system (shown as a rear surface of the yoke 14 being the rearmost component of the magnet system), the frame encapsulates the magnet system and is mechanically locked to the magnet system. That is, because the head 206 extends over a portion of the surface surrounding the exit to the aperture, it forms a first axial-key between the frame and the magnet system, restricting relative movement between the frame and magnet system. And by extending over the rear surface, the frame extends over a portion of the surface surrounding the exit to the opening and forms a second axial-key between the frame and the magnet system, restricting relative movement between the frame and magnet system in an opposed direction to the first axial-key. Each axial-key assists to mechanical couple the frame and magnet system. Consequently, glue between the magnet system and frame is not required and an improved connection between the frame 200 and magnet system 10 is provided. The frame 200 does not extend over portions of the front surface or rear surface so that opposed portions of the front surface and rear surface are exposed. The exposed portions are opposed in an axial direction so that the mould can clamp the magnet system in the axial direction by abutting the exposed portions.

Figure 3:
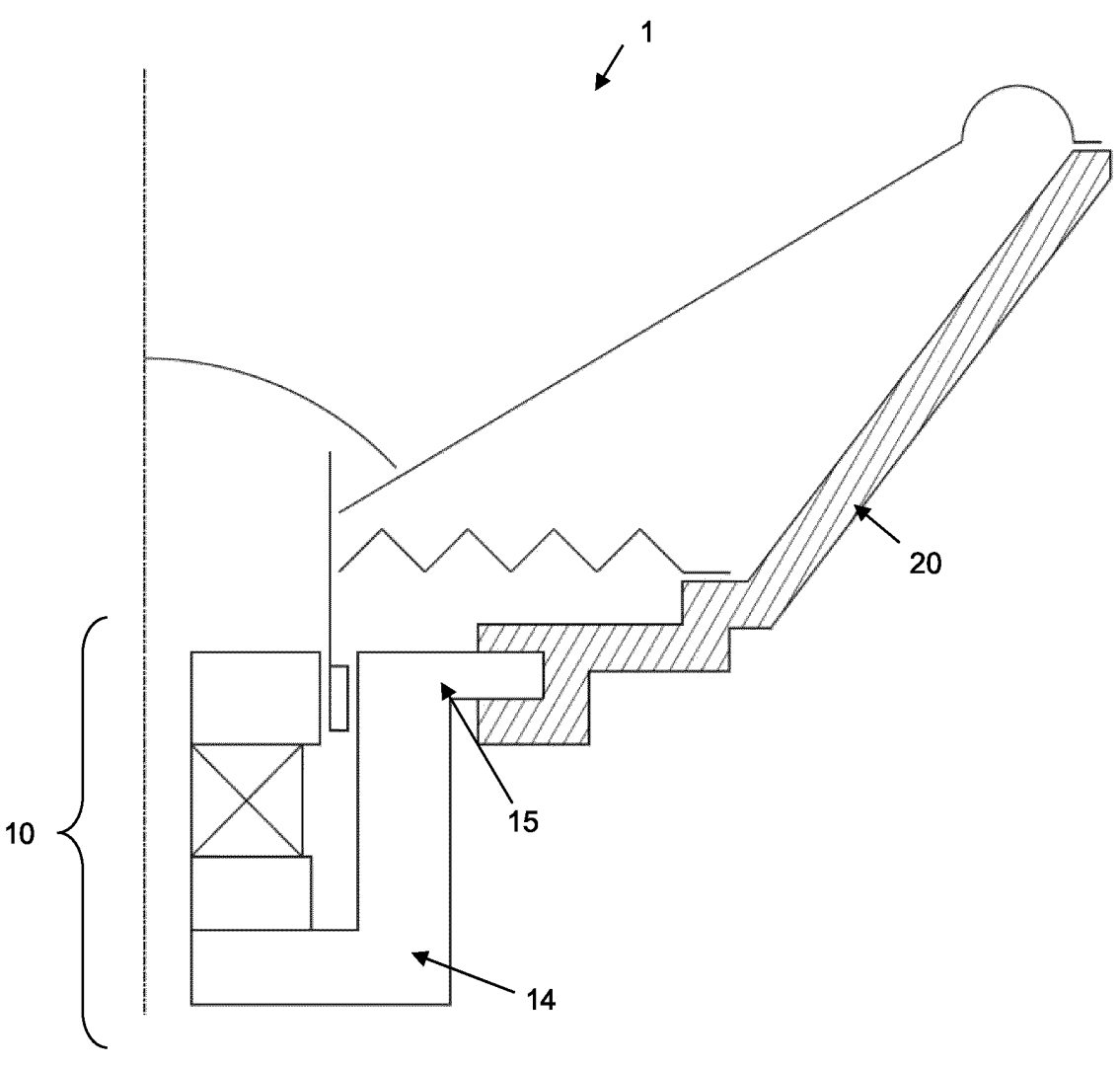
FIG. 3 shows a half section view through a loudspeaker according to an alternative acknowledged art arrangement for example purposes.
Figure 5:
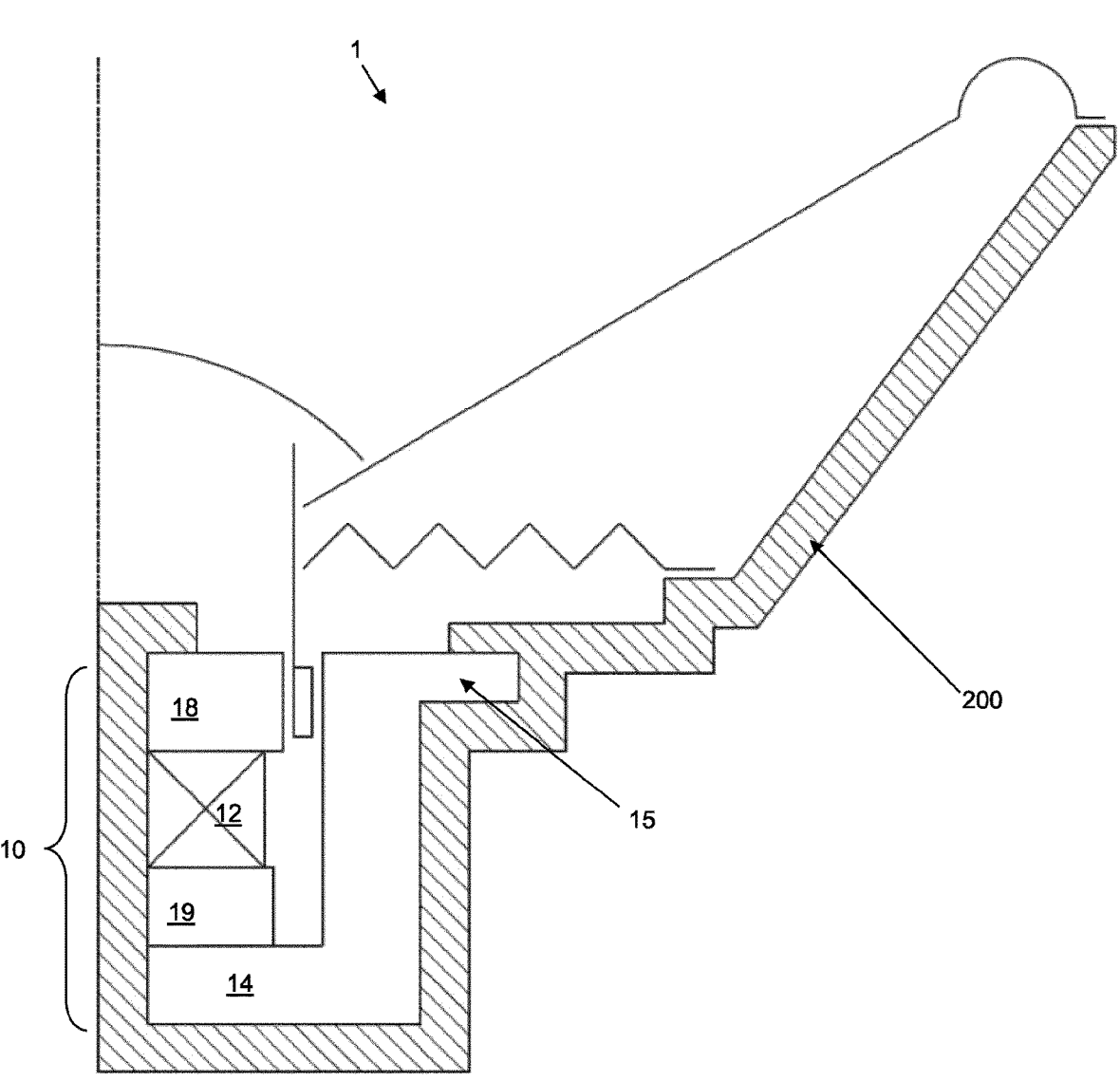
FIG. 5 shows a half section view through a loudspeaker according to an exemplary embodiment.

FIG. 5 shows an alternative embodiment of an exemplary frame 200. Here, although the frame 200 still extends through an aperture in the magnet system 10 and over front and rear surfaces surrounding the aperture to encapsulate the magnet system 10, the frame is also shown as being moulded over a flange 15 of the yoke 14 and is otherwise in accordance with the acknowledged art example shown in FIG. 3.

Figure 6:
FIG. 6 shows a rear perspective view of the loudspeaker of FIG. 4 or 5.
Figure 6:
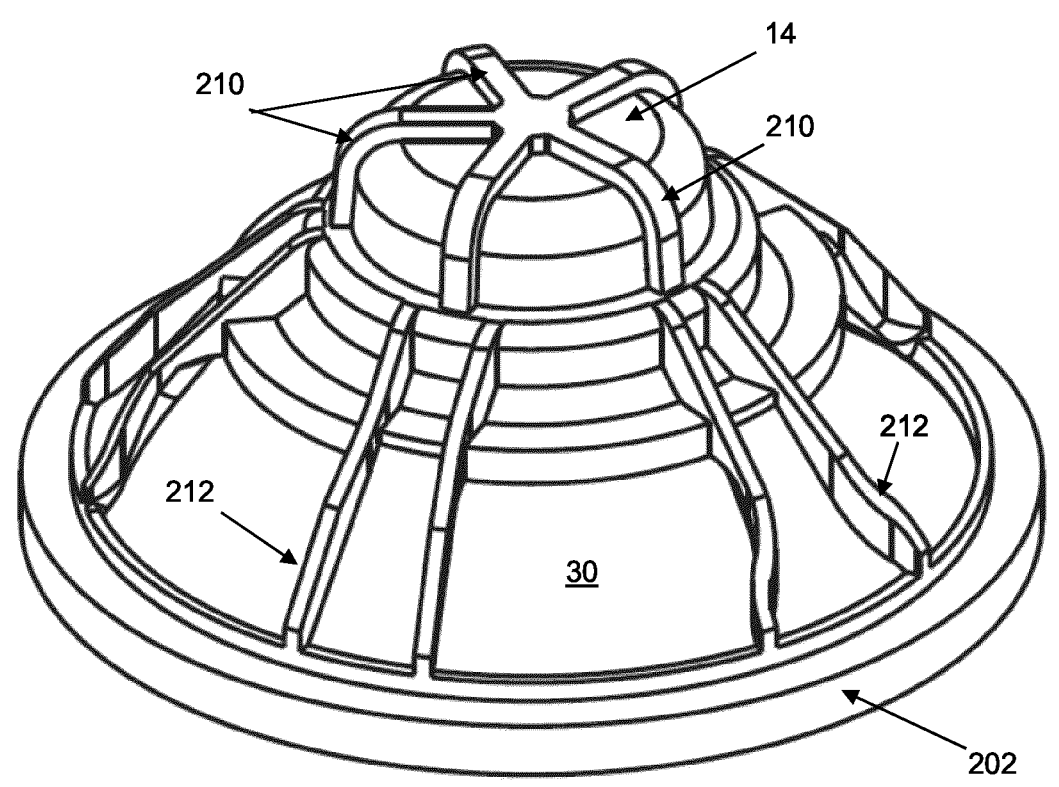

FIG. 6 shows a perspective view of the speaker assembly of FIG. 5. Here, the frame 200 is shown as having ribs 210 that extend around the circumferential wall and the radial wall of the yoke. That is, the cross sections shown in FIGS. 4 and 5 may be shown through specific sections of the speaker assembly. That is, the frame may not completely encapsulate the magnet system, but rather encapsulate the magnet system at specific portions formed by the ribs 210. Between the plurality of ribs 210 are formed gaps that improve the cooling of the speaker assembly. In FIG. 6, the forward portion of the frame 200 is also shown as having ribs 212 connecting the circular distal end 202 to the rear portion.

Figure 7:
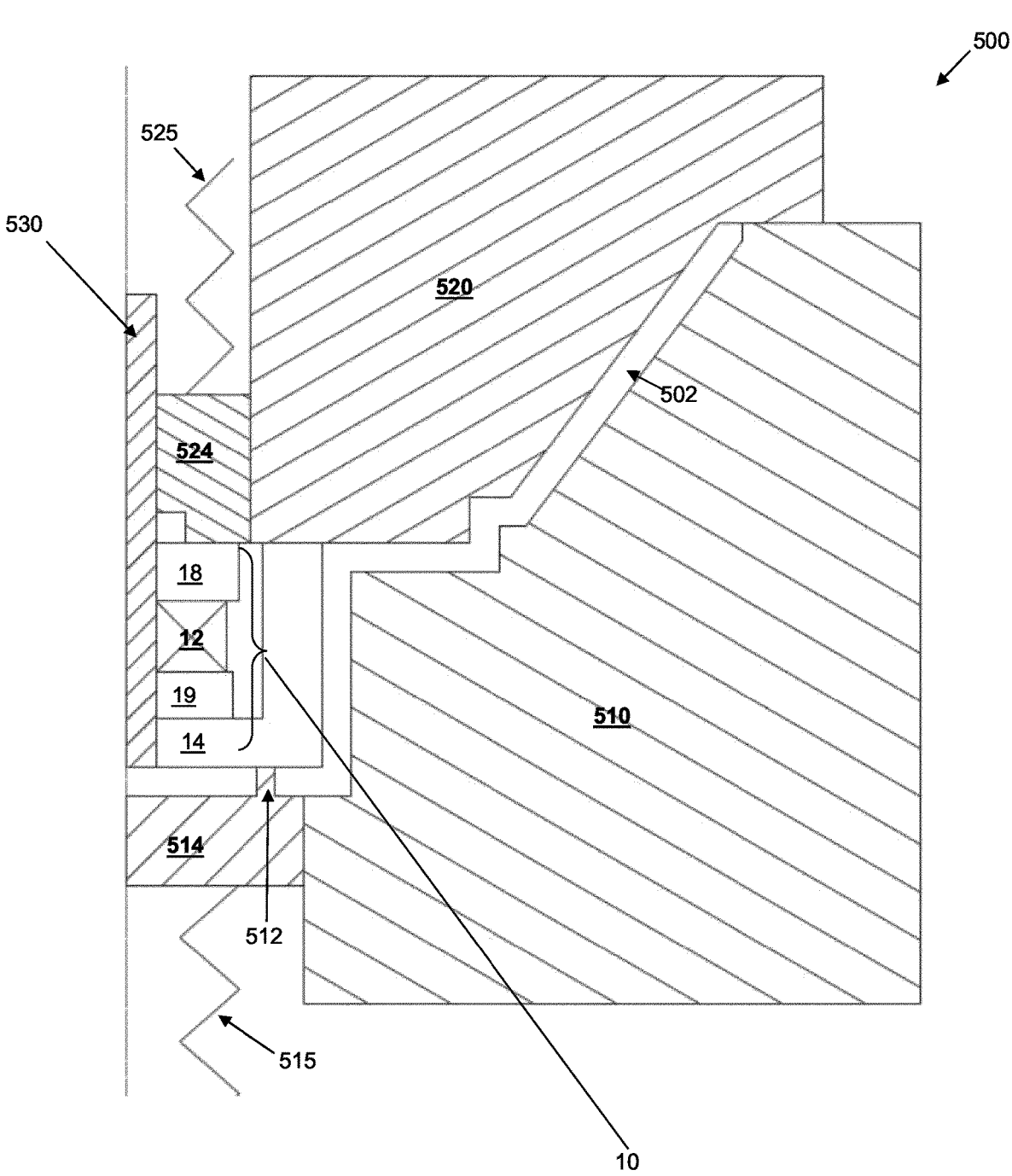
FIG. 7 shows a half section view through a manufacturing mould for use in a process of manufacturing the loudspeaker component of FIG. 4 and with a magnet system arranged in the mould.
Figure 8:
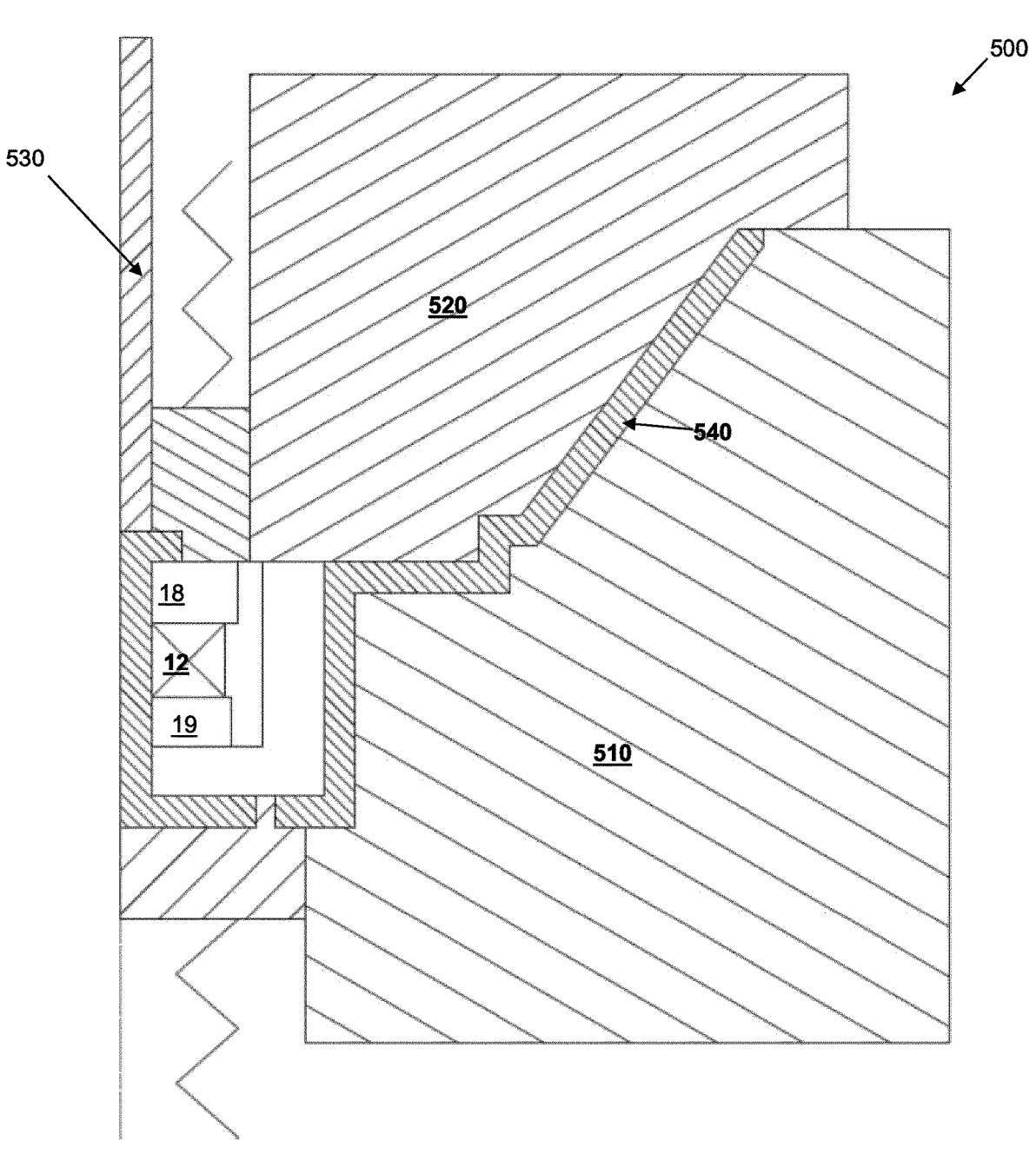
FIG. 8 shows a half section view through the manufacturing mould of FIG. 7 with the mould filled with material to insert mould a frame with the magnet system.

Referring to FIGS. 7 and 8 a method of injection moulding a component of the speaker assembly 1 of FIG. 4 is shown using an injection mould 500. That is, the exemplary method of injection moulding forms a unitary component comprising a frame and magnet system or part of the magnet system, and the speaker assembly is formed by assembling further components to the unitary component. Here, the injection mould includes a fixed mould part 510 and a moveable mould part 520 as well as an insert pin 530. The magnet system 10 is arranged in the injection mould 500. Here, the insert pin 530 is arranged to be inserted through the opening in the magnet system 10. Thus, the insert pin 530 can be used to align the magnet system 10 in the mould and therefore relative to the frame. With the magnet system 10 installed in the mould, the moveable mould part is closed to create a cavity defining the frame. The moveable mould part is clamped to the fixed mould part, and in doing so, the magnet system is clamped and fixed in position. A nib 512 is shown in the injector mould that is arranged to contact the yoke 14 of the magnet system. Moreover, as is known in injection moulding, inserts 524 and 514 of the respective moveable mould part and fixed mould part can be used to ease removal of the moulded frame 200. The inserts can be sprung biased by springs 515, 525 respectively.

With the magnet system held in alignment in the mould, the insert pin 530 can be withdrawn from the aperture in the magnet system (see FIG. 8). In FIG. 8, the insert pin is shown as being withdrawn in to the moveable mould part 520 (i.e. by being moved upwardly), whereas in FIG. 9 an alternative exemplary mould 500 is shown where the insert pin is withdrawn into the fixed mould part (i.e. by being moved downwardly). In both embodiments, withdrawing the insert pin 530 from the aperture in the magnet system extends the cavity to extend through the aperture and connects a portion of the cavity in the injector mould that defines a portion of the frame that extends over the rear surface of the yoke to a portion of the cavity in the moveable mould part that defines a portion of the frame that extends over the front surface of the magnet plate 18. Once withdrawn, the cavity can be filled with material 540 to injection mould the frame as a single piece and to encapsulate the magnet system. As will be appreciated, the mould 500 can be opened and the frame released from the mould. Because the frame is formed as a single piece that encapsulates the magnet system, further steps to assemble the magnet system and frame are not needed.

Figure 10:
FIG. 10 shows a half section view through an alternative manufacturing mould for use in a process of manufacturing the loudspeaker component of FIG. 4 and with a magnet system arranged in the mould.
Figure 10:
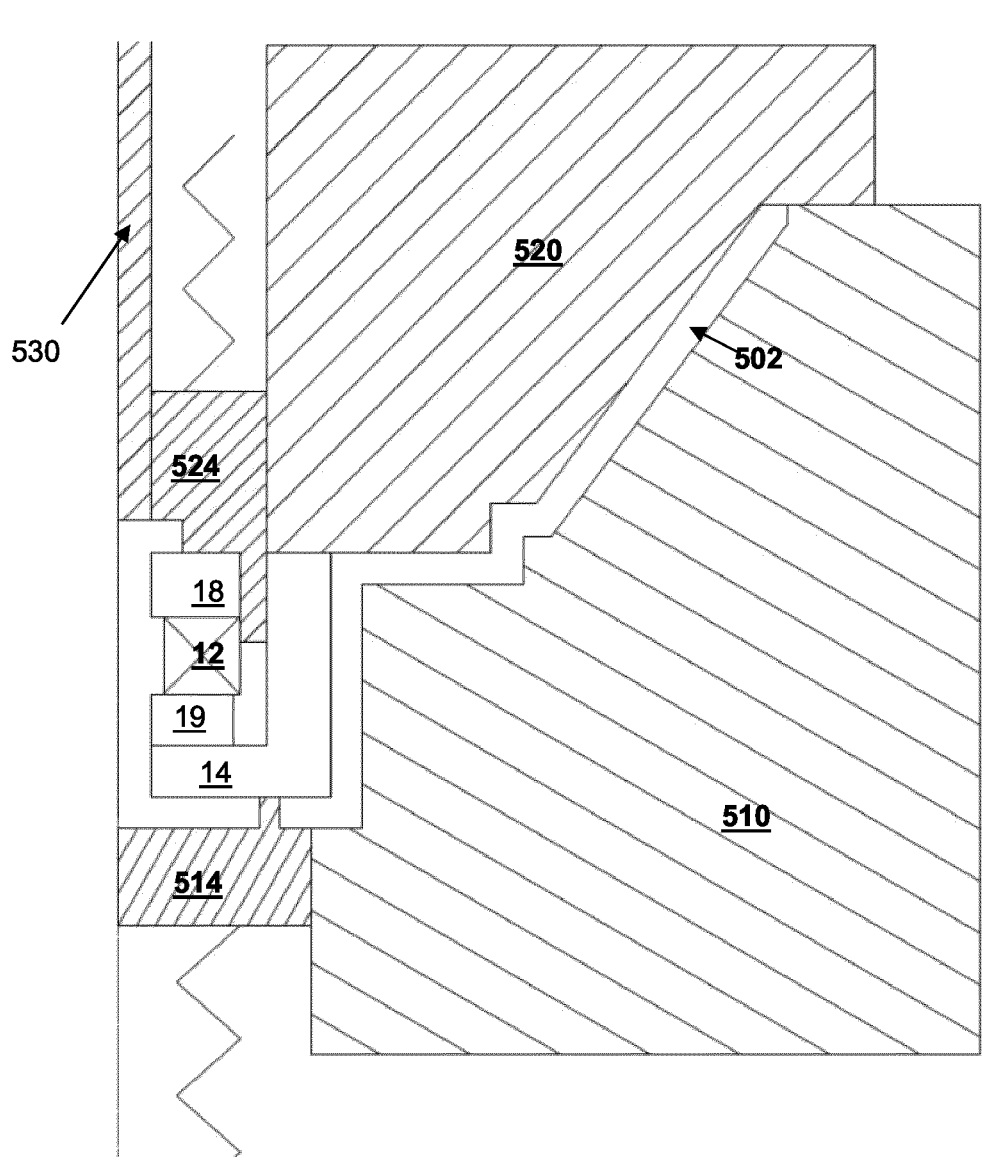

FIG. 10 shows a further exemplary embodiment of the mould 500. The mould 500 is similar to the mould shown in FIGS. 8 and 9 except the insert 524 of the moveable mould part 520 extends into the gap formed between the yoke and the magnet. This extension is used to align the magnet 12 of the magnet system. As shown, an opening in the magnet 12 is larger than an opening in the yoke 14, spacer 19 and magnet plate 18. Consequently, with a straight insert pin, whilst inside surfaces of the respective openings through the yoke 14, spacer 19 and magnet plate 18 can be aligned on the insert pin 530, the magnet 12 can be aligned using its outside surface in conjunction with the extension of the insert 524. FIG. 10 shows the insert pin 530 withdrawn to create the cavity 502 in the mould to mould the required shape of the frame.

Figure 11:
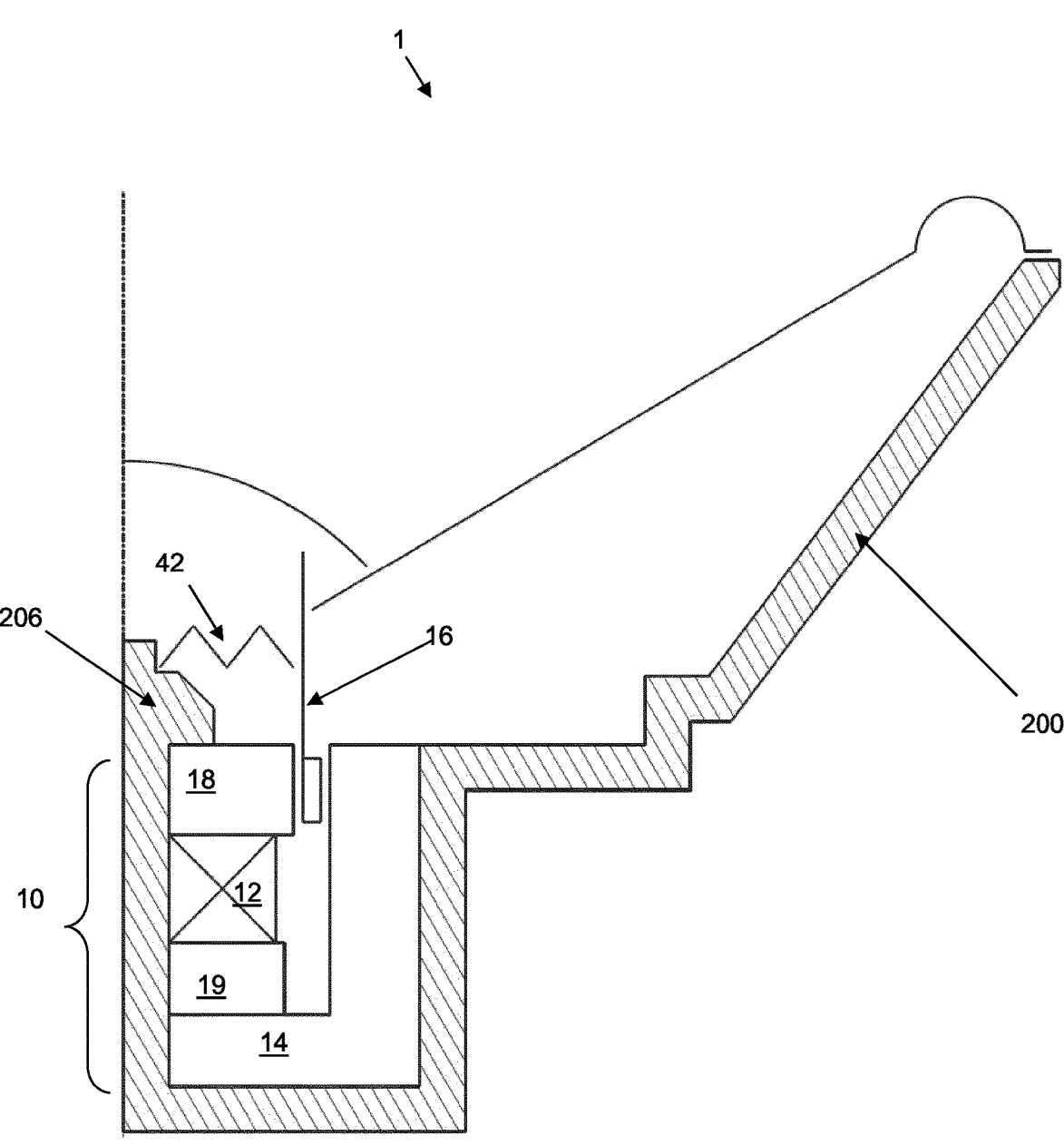
FIG. 11 shows a half section view through a loudspeaker according to an alternative exemplary embodiment.

FIG. 11 shows a further adaption to the exemplary embodiment shown in FIG. 4, wherein the damper 42 is arranged internally. Here, the head 206 is extended to provide a connection portion for the damper 42. It will be appreciated that the exemplary moulds can be easily adapted to change the shape of the formed cavity to mould the extended head 206.

Figure 12:
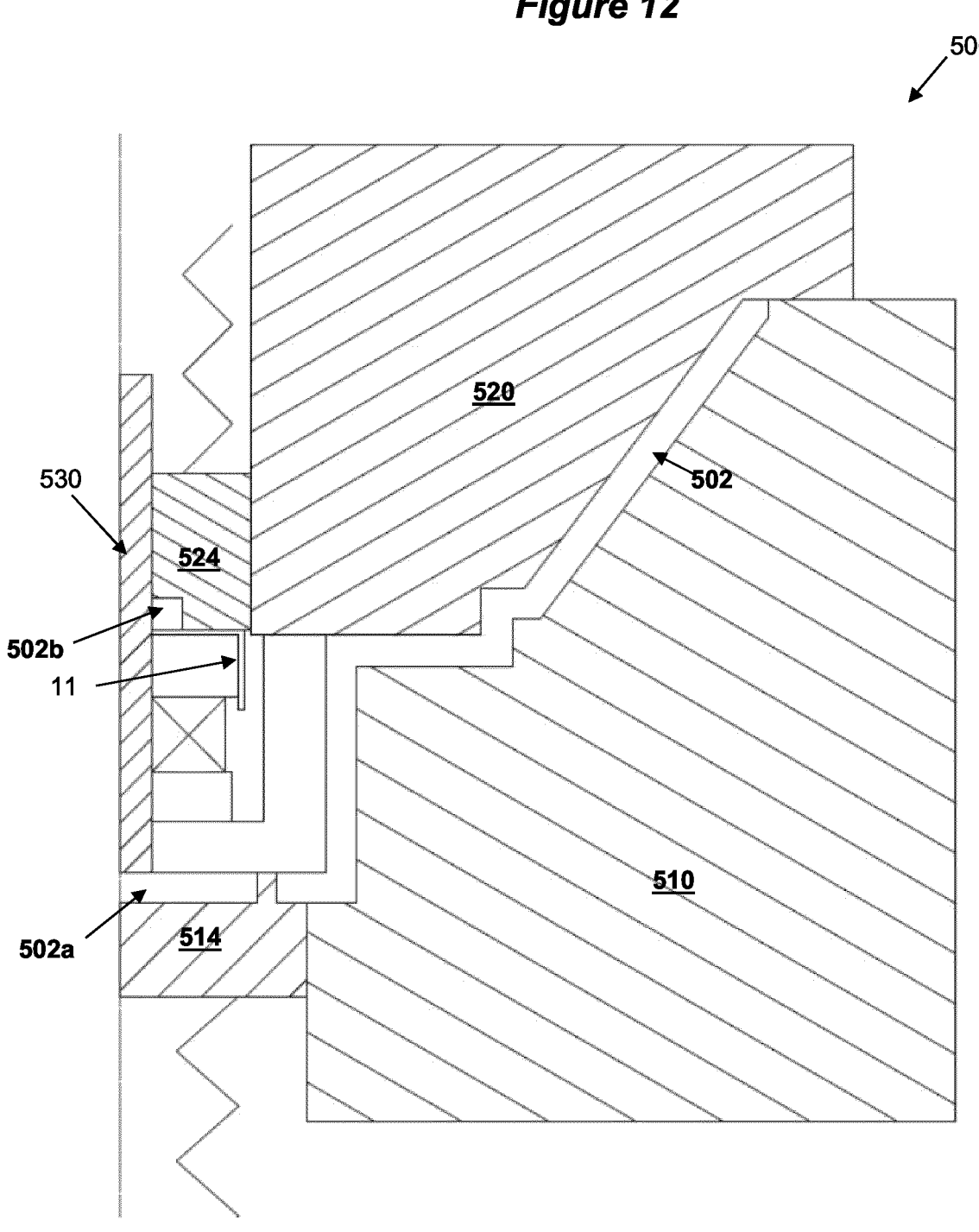
FIG. 12 shows a half section view through an alternative manufacturing mould for use in a process of manufacturing an alternative loudspeaker component and with a magnet system arranged in the mould.

In FIG. 12, the magnet system 10 is further shown as including a shortcut ring 11. Here, the short cut ring 11 has an opening that is aligned with the opening in the magnet plate 18 to also form part of the aperture through the magnet system 10. As the front most component of the magnet system 10, the head 206 of the frame is formed to extend over the front surface of the short cut ring. As shown in FIG. 11, the head 206 of the frame will be formed by withdrawing the insert pin 530 from the aperture and connecting the portion of the cavity 502a in the fixed mould part 510 with the portion of the cavity 502b in the moveable mould part 520.

Figure 13:
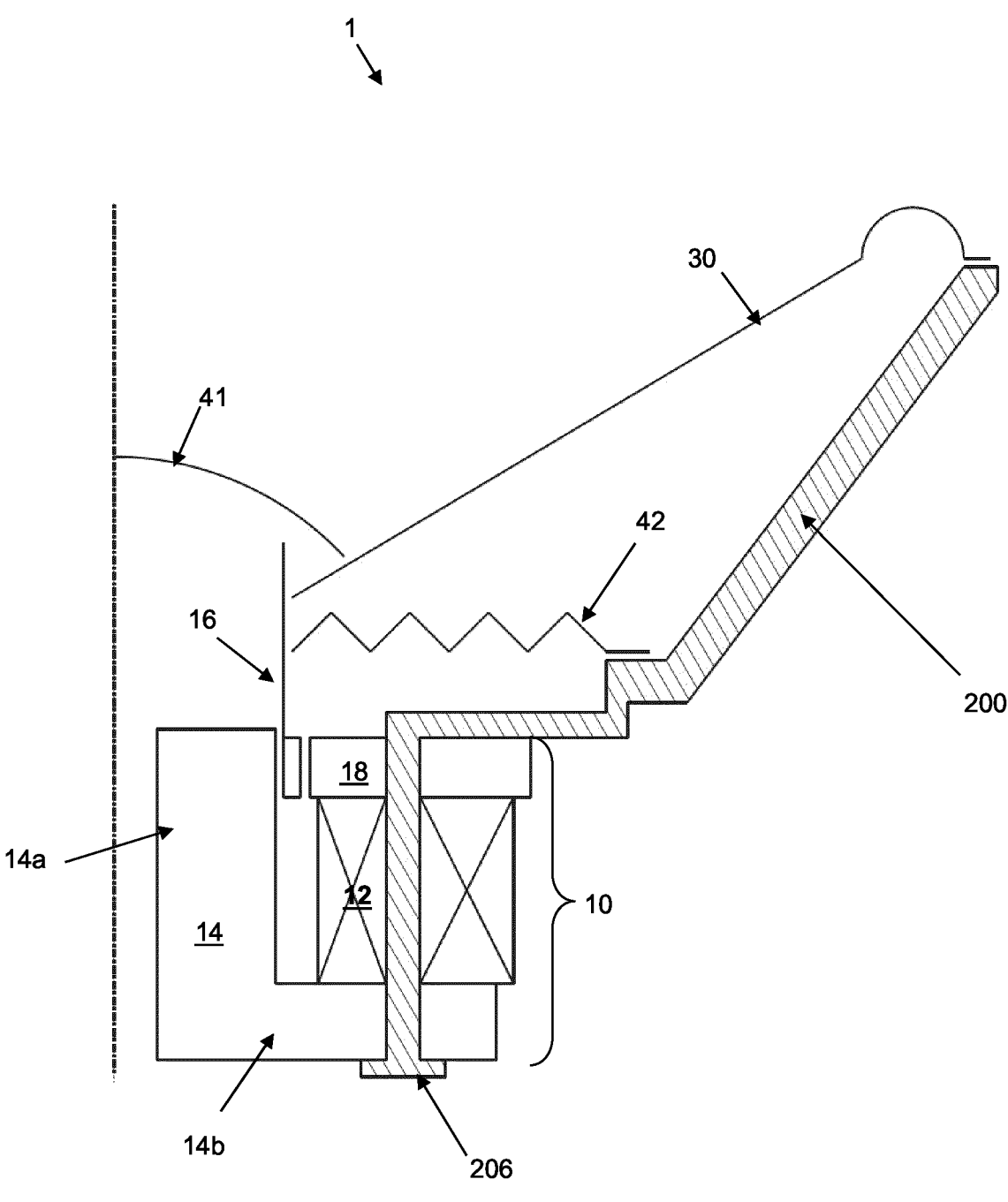
FIG. 13 shows a half section view through a loudspeaker according to an alternative exemplary embodiment.

FIG. 13 shows an alternative speaker assembly that utilises a T-yoke rather than the U-yoke shown in the previous embodiments. It will be appreciated that other than the other parts of the magnet system being arranged on the outside of the yoke, the components of the magnet system 10 are substantially the same as previous embodiments. But, as is known, the T-yoke comprises a circumferential wall 14a and a radial wall 14b that extends outwardly from the circumferential wall. The radial wall provides a shelf upon which the other parts of the magnet system 10 are mounted. The frame 200 is shown as having a similar forward portion to previous embodiments, but rather than extending around the yoke, the rear portion of the frame extends over the front of the magnet system before extending through the aperture in the magnet system. Here the distal head 206 is still formed to extend over the surface adjacent the opposite opening (i.e. the rear surface of the yoke) to encapsulate the magnet system 10. The rear portion of the frame that extends through the aperture does not extend completely around a circumference. Rather, to maintain the parts of the magnet system 10 as integral components, a plurality of openings are formed in each respective part, which when aligned create a plurality of apertures through the magnet system and through which the frame is moulded to extend. A head 206 is formed to terminate the frame at each point it extends through the aligned openings. The plurality of apertures are arranged at intervals, typically about a circumference and at equal spacing.

Figure 14:
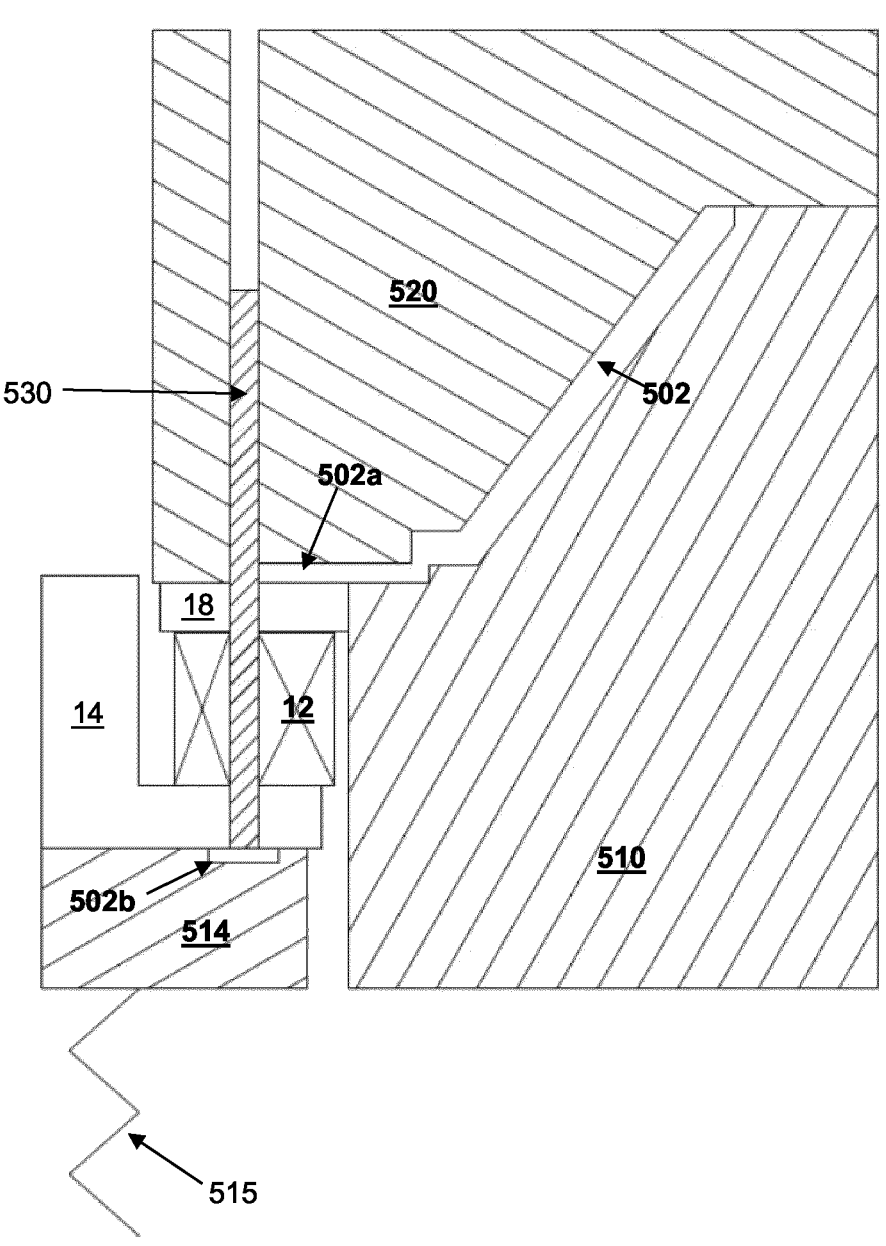
FIG. 14 shows a half section view through a manufacturing mould for use in a process of manufacturing the loudspeaker component of FIG. 13 and with a magnet system arranged in the mould.
Figure 15:
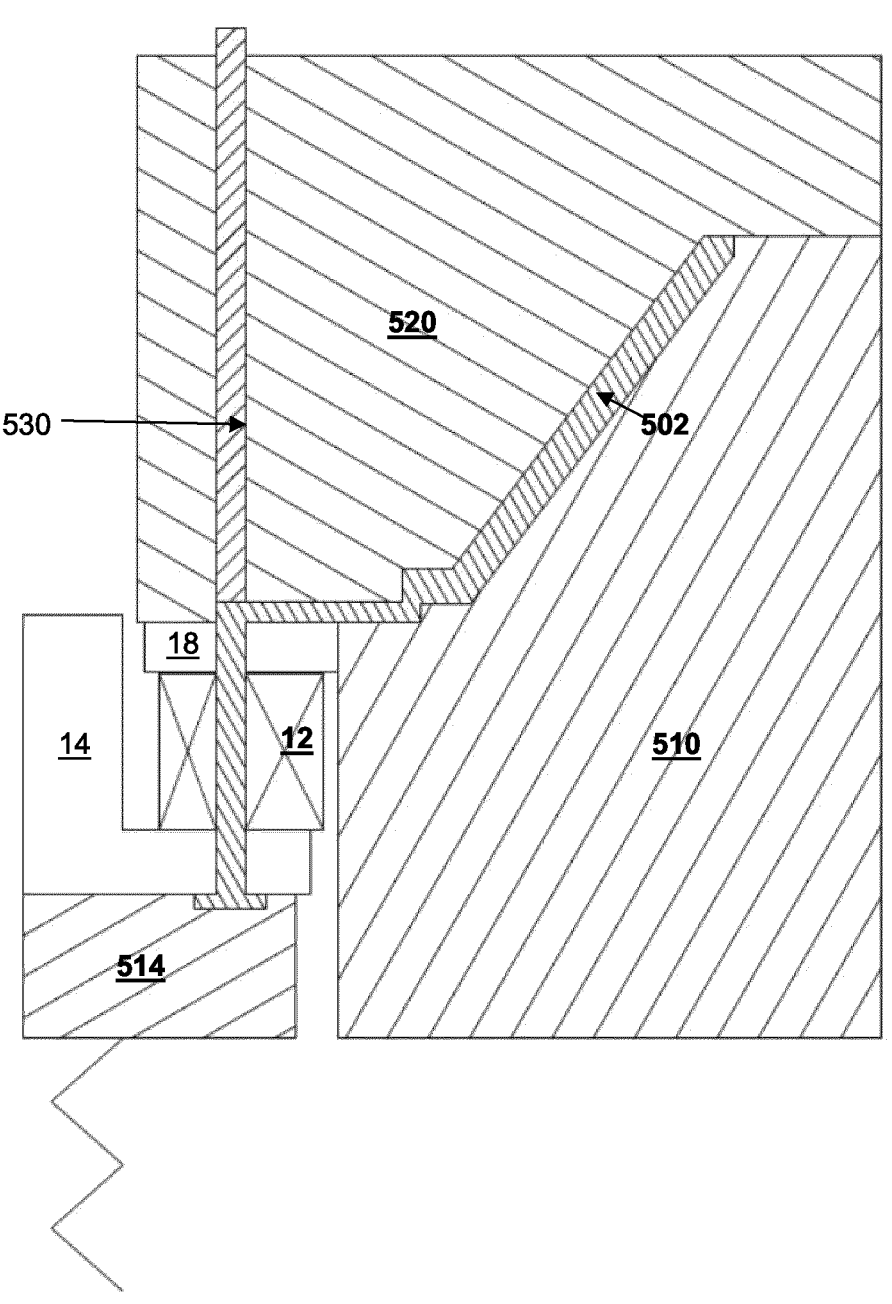
FIG. 15 shows a half section view through the manufacturing mould of FIG. 14 with the mould filled with material to insert mould a frame with the magnet system.

FIGS. 14 and 15 show the moulding process using an exemplary mould 500 for forming a component of the speaker assembly shown in FIG. 13. Because the magnet system includes multiple discrete apertures that the mould is configured to fill, the mould 500 includes multiple insert pins 530 (only one is shown). Similarly to previous embodiments, when each insert pin is withdrawn from the respective discrete aperture, the formed cavity is filled with material to injection mould the frame as a single piece that encapsulates the magnet system averting the need for further manufacturing steps to secure the frame and magnet system and providing an improved connection.

Figure 16:
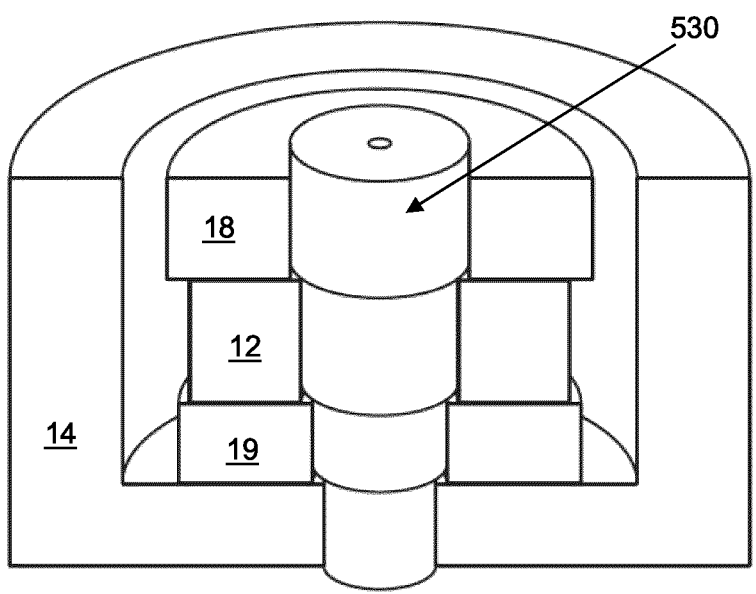
FIG. 16 shows a partial cross-sectional view of a magnet system and portion of a mould according to one exemplary embodiment.
Figure 17:
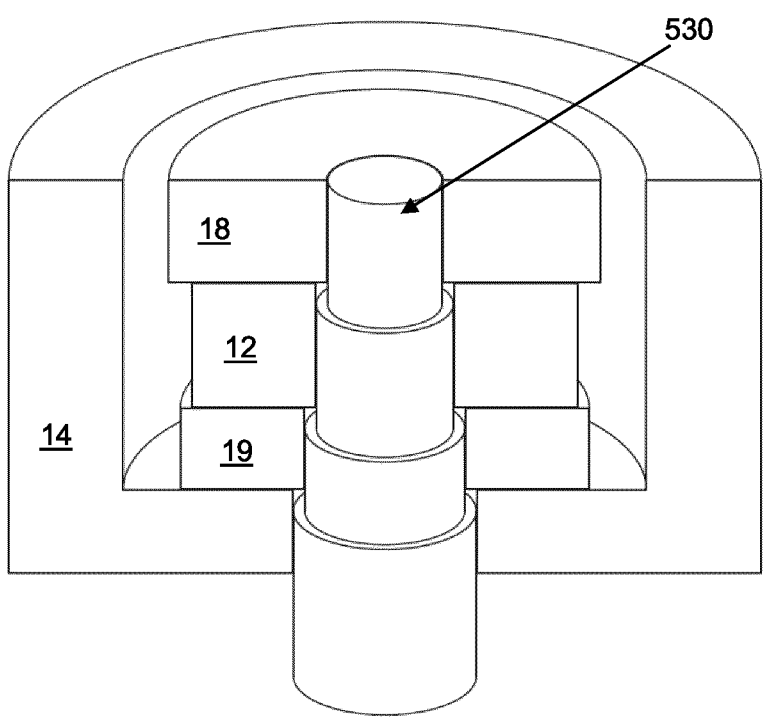
FIG. 17 shows a partial cross-sectional view of a magnet system and portion of a mould according to another exemplary embodiment.
Figure 18:
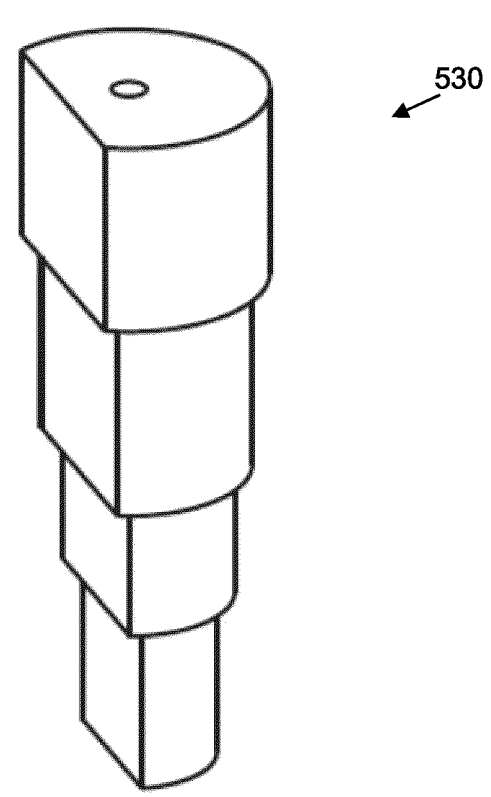
FIG. 18 shows a perspective view of a portion of a mould according to another exemplary embodiment.

FIGS. 16 and 17 show insert pins 530 that have a non-constant cross-section. In FIG. 16, the insert pin is shown as being configured to be withdrawn upwardly, whereas in FIG. 17, the insert pin 530 is shown as being withdrawn downwardly. The difference being that in FIG. 16, the forward most component (i.e. magnet plate) is shown as having an opening with a large size, with the openings in the subsequent parts (relative to the direction of insertion of the insert pin into the aperture) of the magnet system getting sequentially smaller. In FIG. 17 it is the other way around. In these embodiments, the cross-section of the insert pin is stepped to correspond to the change in sizes of the openings. That is, the insert pin has a portion with a large cross-section corresponding to the part of the magnet system having the largest opening, and a portion having a smaller cross-section corresponding to a size of an opening in a subsequent part. In FIG. 18, rather than the cross-section of the insert pin being circular, the insert pin 530 is shown as having a non-circular cross section. It is shown in FIG. 18 in relation to the stepped variant, but the non-circular embodiment is equally applicable to the straight insert pins. The non-circular cross-section enables the aperture through the magnet system to have a corresponding non-circular shape in order to provide rotational alignment of the magnet system relative to the frame. A number of non-circular shapes are envisaged, but the non-circular cross-section shown in FIG. 18 is a faceted circle having a single alignment position. As will be appreciate, the variant insert pins shown in FIGS. 16 to 19 are equally applicable to the embodiments having a single discrete aperture through the magnet system 10 (so a single insert pin in the mould) as well as the embodiments having a plurality of discrete apertures through the magnet system (so multiple insert pins).

Figure 19:
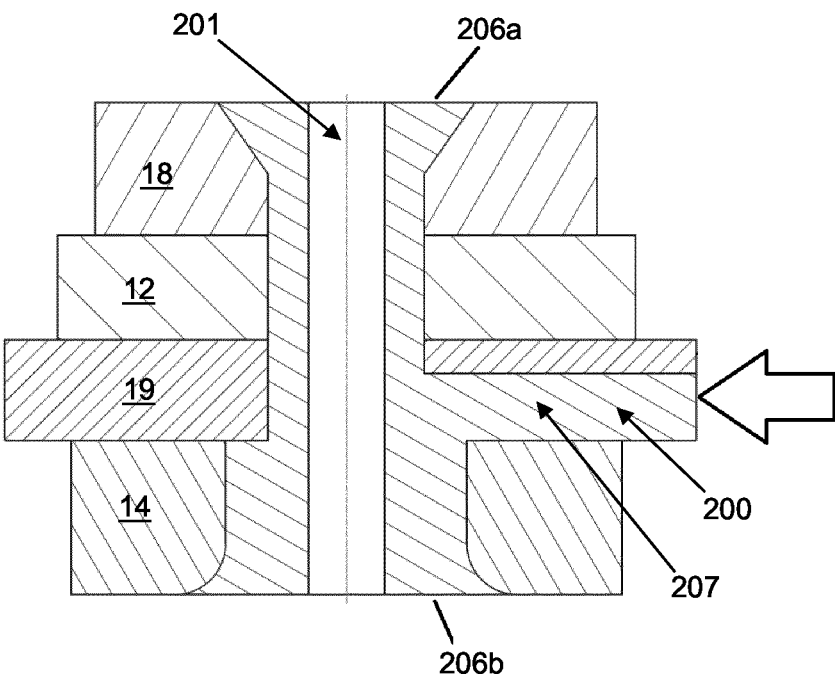
FIG. 19 shows a cross section through an exemplary portion of a loudspeaker showing alternative options.

FIG. 19 shows an example having optional features that can be incorporated into the above described embodiments. A first option shown is to form the axial-key as being a portion of the frame 200 that extends over a recessed surface adjacent the exit to the aperture. Here, the frame's head 206 is moulded within the recess to lie flush with the outer surface of the magnet system (shown as the upper surface of the magnet plate 18). The recess is shown as being tapered, but it is envisaged the recess could have a square profile or any suitable profile to cause the head 206a to extend over a surface adjacent the exit (in the example shown in FIG. 19, this is the tapered surface). A second option shown is to form the second axial-key as a lower head 206b of the frame. Here, the frame is moulded to form in the aperture through the magnet system with an upper head 206a and a lower head 206b (the upper and lower heads being opposed) forming the mechanical connection between the frame and magnet system. The portion of the frame extending through the aperture is connected to the forward portion of the frame (i.e. that supports the diaphragm) via a branch from the aperture. The branch is shown as portion 207 and is shown as being radial to the aperture and formed in a gap between the components of the magnet system. A further option shown in FIG. 19 is to form the frame through the aperture in the magnet system 10 as a hollow portion. That is, the hollow portion includes an axial through bore 201. The axial through bore 201 can be moulded using an insert pin having an extended length. The extended length of the insert pin can provide a first portion arranged in the magnet system and to act as a jig to align the magnet system (and in particular the components of the magnet system) as herein described. A second portion of the insert pin can have a smaller cross section. Here, withdrawing the insert pin, withdraws the first portion from the magnet system, but in doing so moves the second portion into the centre of the aperture through the magnet system. Thus, the frame is moulded in the aperture around the second portion of the insert pin with a smaller size. When the frame is de-moulded (including being de-moulded from the insert pin), the axial bore is formed where the second portion of the insert pin remained in the magnet system.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method of injection moulding a speaker assembly, the method comprising:

providing a magnet system having an aperture from a first side to a second side;

arranging the magnet system in a mould with an insert pin of the mould inserted into the aperture;

clamping a first mould part and a separable second mould part together to form a mould cavity and to clamp the magnet system;

withdrawing the insert pin from the aperture in the magnet system to extend the cavity through the aperture in the magnet system and; and injecting material into the cavity.

2. The method of claim 1, wherein:

the step of arranging the magnet system in the mould with the insert pin of the mould inserted into the aperture comprises inserting a plurality of insert pins into a respective plurality of discrete apertures, and the step of withdrawing the insert pin from the aperture in the magnet system to extend the cavity through the aperture in the magnet system comprise withdrawing at least one of the plurality of insert pins.

3. A speaker assembly comprising a magnet system mounted to a single piece frame;

characterised in that the magnet system has an aperture from a first side to a second side;

the frame extends through the aperture in the magnet system;

the frame and magnet system comprise an axial-key; and the frame exposes a portion of the first side and an opposed portion of the second side.

4. The method of claim 1 wherein the magnet system and the cavity are configured to form a speaker assembly as claimed in claim 3.

5. The speaker assembly of claim 3, wherein the frame extends over at least a portion of a first surface adjacent the first side of the aperture to form the axial-key.

6. The speaker assembly of claim 3, wherein the frame extends over at least a portion of a second surface adjacent the second side of the aperture to form the axial-key.

7. The speaker assembly of claim 3, wherein the magnet system includes a yoke having an opening that forms at least a portion of the aperture, the second side of the magnet system is a front, and the frame extends through at least the opening in the yoke to terminate at the front of the magnet system.

8. The speaker assembly of claim 7, wherein the frame extends around the magnet system from a front of the magnet system to a rear of the magnet system and wherein the portion of the frame extending around the magnet system comprises a plurality of ribs.

9. The speaker assembly of claim 3, wherein the magnet system includes a yoke having an opening that forms at least a portion of the aperture and the opening is coincident with a central axis of the magnet system.

10. The speaker assembly of claim 3, wherein the magnet system includes a yoke having a plurality of openings that each form at least a portion of a plurality of apertures through which the frame extends.

11. The speaker assembly of claim 3, wherein the magnet system includes a yoke having an opening, the second side of the magnet system is a rear, and the frame extends through at least the opening in the yoke to terminate at the rear of the magnet system.

12. A mould for Injection moulding a frame for a speaker assembly, wherein:

the mould comprises a first mould part and a separable second mould part that define a cavity when clamped together in a draw direction; and when clamped together, the first mould part and second mould part are configured to clamp a magnet system within the mould;

characterised in that the mould includes an insert pin arranged to move between a first position and a second position, wherein, in the first position, the insert pin is configured to extend into an aperture of the magnet system so as act as a jig to align the magnet system prior to being clamped by the first and second mould parts, and in the second position, the insert pin is withdrawn from magnet system such that the magnet system and insert pin define an extension of the cavity through the aperture in the magnet system.

13. The mould of claim 12, wherein the insert pin is a single discrete insert pin or a plurality of discrete insert pins, and the or each insert pin is independently moveable relative to the first mould part and the second mould part.

14. The mould of claim 13, wherein the or each insert pin has a constant cross-section along a length of said insert pin.

15. The mould of claim 13, wherein the or each insert pin has a non-constant cross-section along a length of said insert pin.

16. The mould of claim 13, wherein at least a portion of the or each insert pin has a circular cross-section.

17. The mould of claim 13, wherein at least a portion of the or each insert pin has a non-circular cross-section.

* * * * *